United States Patent
Baba et al.

(10) Patent No.: US 6,406,371 B1
(45) Date of Patent: Jun. 18, 2002

(54) DATA COMMUNICATION METHOD FOR GAME SYSTEM

(75) Inventors: Yasuhito Baba; Eiji Horita; Hiroyuki Miyazaki, all of Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/631,937

(22) Filed: Aug. 3, 2000

(30) Foreign Application Priority Data

Aug. 4, 1999 (JP) .......................................... 11-221177
May 9, 2000 (JP) ...................................... 2000-136343

(51) Int. Cl.[7] .............................................. G06F 17/00
(52) U.S. Cl. .............................. 463/42; 463/43; 700/92
(58) Field of Search ................................ 463/42–44, 1; 700/91–92

(56) References Cited

U.S. PATENT DOCUMENTS

| | | | | |
|---|---|---|---|---|
| 4,521,014 A | * | 6/1985 | Sitrick | 273/1 GC |
| 5,083,271 A | * | 1/1992 | Thacher et al. | 364/411 |
| 5,560,603 A | * | 10/1996 | Seelig et al. | 463/6 |
| 5,593,349 A | * | 1/1997 | Miguel et al. | 463/30 |
| 5,779,549 A | * | 7/1998 | Walker et al. | 463/42 |
| 5,846,132 A | * | 12/1998 | Junkin | 463/42 |
| 5,956,485 A | * | 9/1999 | Perlman | 395/200.34 |
| 6,005,476 A | * | 12/1999 | Valiulis | 340/310.01 |
| 6,012,984 A | * | 1/2000 | Roseman | 463/42 |
| 6,048,271 A | * | 4/2000 | Barcelou | 463/48 |
| 6,082,887 A | * | 7/2000 | Feuer et al. | 364/410.1 |
| 6,203,433 B1 | * | 3/2001 | Kume | 463/42 |

* cited by examiner

Primary Examiner—Valencia Martin-Wallace
Assistant Examiner—Scott E. Jones
(74) Attorney, Agent, or Firm—Finnegan, Henderson, Farabow, Garrett & Dunner, L.L.P.

(57) ABSTRACT

Double registration or improper registration of the data of participating teams is prevented in an online-participation game system. Provided is a data communication method for game systems in which game meets are carried out by sending transmission files including data of each team to a server from each of a plurality of game terminal devices, and by thus simulating a competition among the teams, the above-mentioned method comprising: a process wherein the game terminal devices generate transmission files including an identification code (login ID) and game data and send the files to the server; and a process wherein the server checks the identification code of the transmission files received and appends the transmission files received to a registration file for the game meet, in the case when the files do not comprise identification codes identical to those in the accepted transmission file group.

15 Claims, 24 Drawing Sheets

UNIT FLASH MEMORY

INITIAL STATE

UNIT FLASH MEMORY

AFTER ACQUISITION OF LOGIN ID

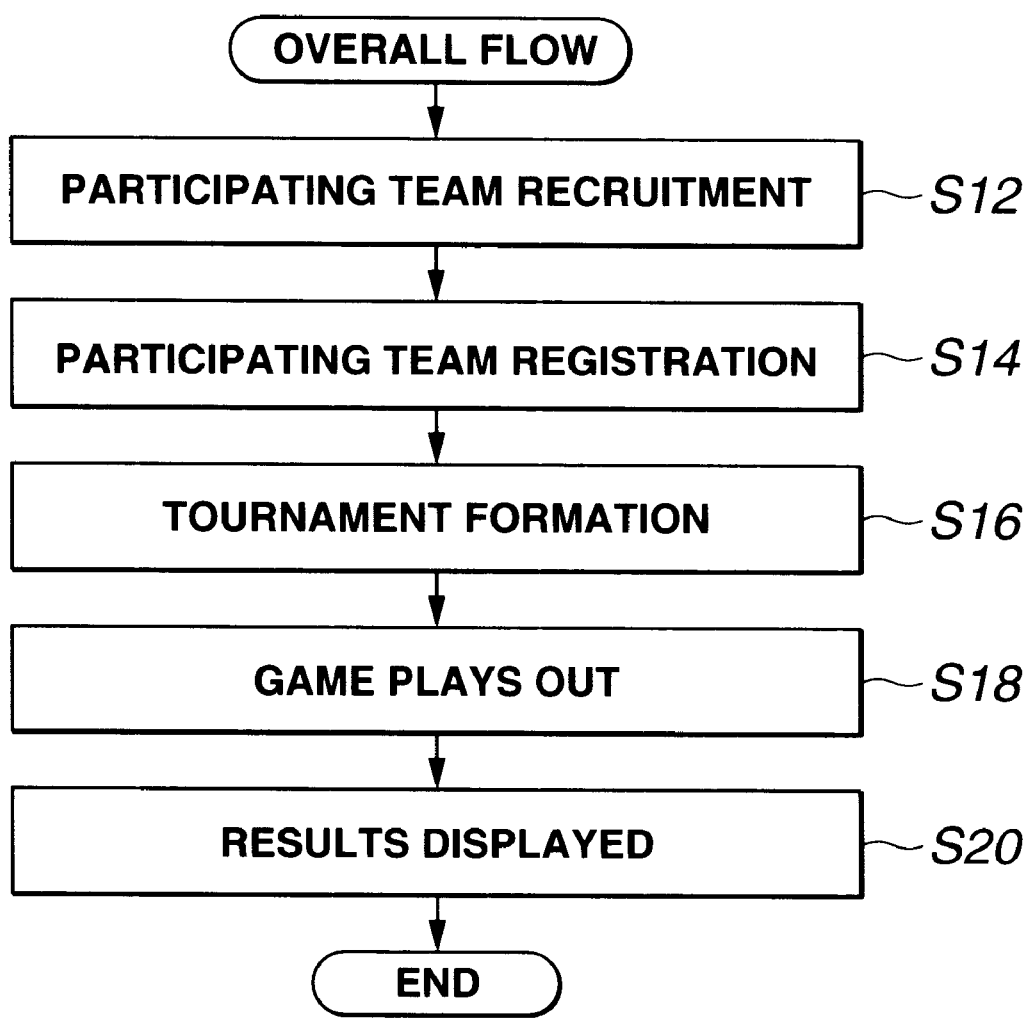

FIG.14

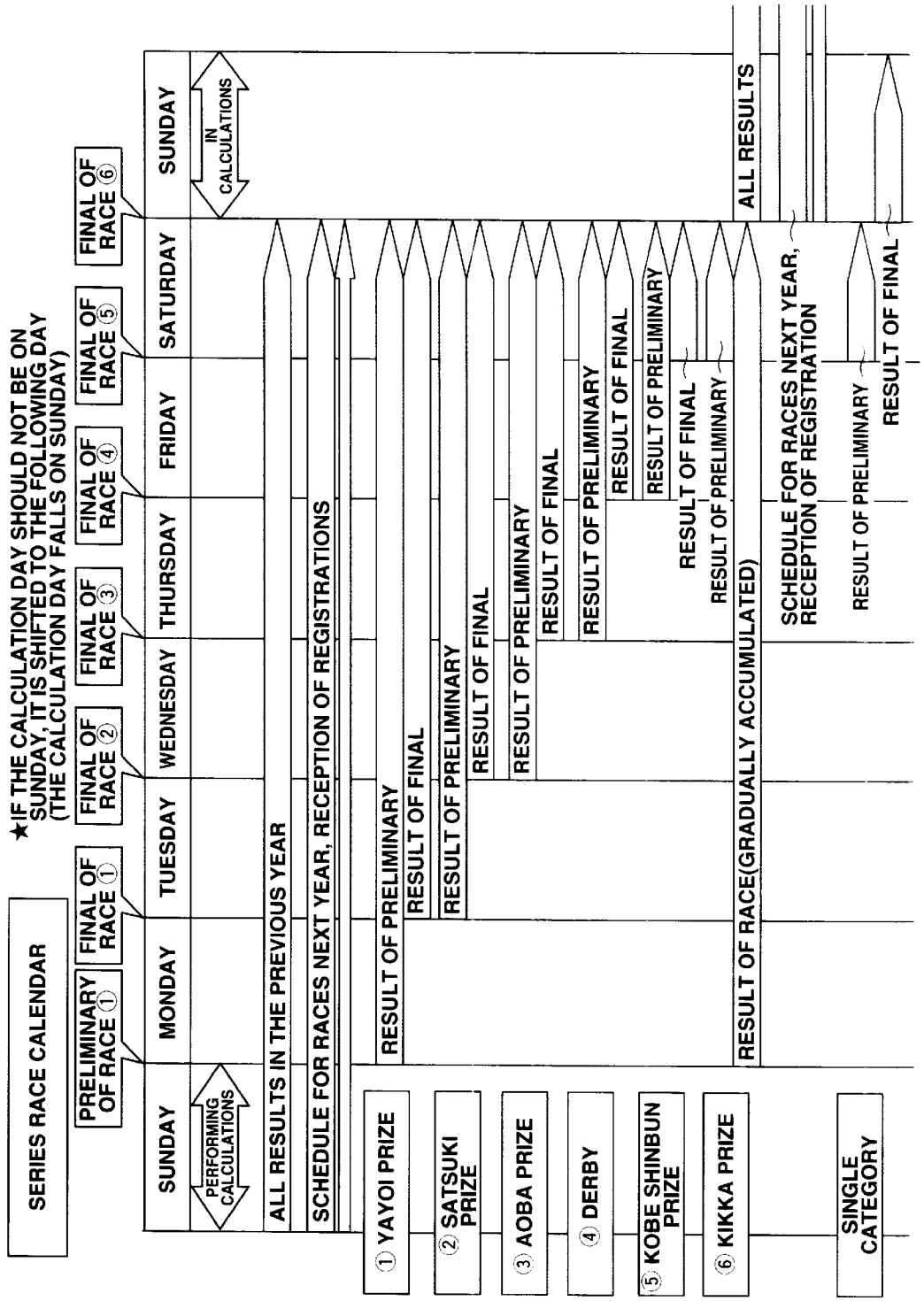

DATA COMMUNICATION METHOD FOR GAME SYSTEM

BACKGROUND OF THE INVENTION

1. Field of the Invention

The present invention relates to a game device, and more particularly to a game device and a data communication system using a communications line such as the Internet and allowing characters, such as teams formed by players, horses, boats, and vehicles for races to participate in game meets provided by a server and compete in matches and races.

2. Description of the Related Art

Conventionally, game devices have been provided with communications interfaces, enabling two people to play a game by connecting game devices together via a communications line and exchanging game data. The communications line basically only connects two points, so it is difficult for a large number of players to participate in the game at the same time. Also, when winning or losing the game depending on differences in proficiency among the players, it is difficult to make an overall ranking (relative merits) among a large number of players.

Therefore, the concept of holding a game meet on a network using a web server connected to the Internet and having each player participating therein was considered. For example, the players form teams while working out a prescribed game on their own game devices in advance. Teams include baseball teams, soccer teams, basketball teams, volleyball teams, vehicle racing teams, and so forth. A game result is obtained by causing one's own team to participate in the meet and playing matches in a tournament or league format. Each match is simulated and carried out by sending the game parameters of both teams to the game engine, which is installed at the web server, and holds the virtual match. Also, once the competition is over, one can download to one's own game device the game parameters of one's own team and the opposing team and play another match. Here, the game parameters are the data necessary for the game engine (match simulation program) to hold out a virtual match.

For holding this type of game meet, it is desirable to set limits, whereby one team per player can participate in one meet, in order to provide an opportunity for a large number of people to participate and prevent the web server from being overloaded. In this case, it is necessary to identify a player or game device. Because a game device is usually connected to the Internet on a dial-up connection by means of a service provider, the IP address is assigned whenever a connection is made and the game device does not have a unique IP address. For this reason, IP addresses cannot be used to identify the game devices.

Also, there should also be a prohibition on downloading the data of another team and registering that data as one's own team data and taking part in a match using it, or acquiring the data of another strong team and modifying and participating with that data should be prohibited as well.

SUMMARY OF THE INVENTION

Accordingly, it is an object of the present invention to provide a game system for realizing participation on a one person-one team or one team per one device (game device) basis, for a game wherein a plurality of people participate and a simulation is effected over a network.

It is another object of the present invention to provide a game system wherein it is not possible to acquire the game data of another person and register for a game meet with that data as one's own team data.

In order to achieve the above-mentioned objects, the data communication method for a networked game, relating to the present invention, comprises: a process wherein, in a first storage means (flash memory, for example) housed in a game terminal device which stores a first identification code (a unique number such as a serial number, for example) allocated in advance to each game terminal devices, a second identification number (login ID or password, for example) is further stored, the second identification number being allocated by the server or network (Internet service provider, game server, for example); a process for storing a first game data file including at least the above-mentioned first identification code in second storage means (memory card, for example) that can be removed from each of the above-mentioned game terminal devices; and a process for forming a transmission data file which includes the above-mentioned second identification code and which is to be transmitted from the above-mentioned game terminal device on the condition that the above-mentioned first identification code within the game data file, stored in the above-mentioned second storage means, matches the above-mentioned first identification code, stored in the above-mentioned first storage means.

Such a constitution makes it possible to prohibit the uploading of a file transmitted from another person's game device using a memory card or the like and makes it possible to transmit only one's own game data to the server.

The data communication method for game systems relating to the present invention is a data communication method for game systems for transmitting transmission files including game data from each of a plurality of game terminal devices to a server, and carrying out competition on the server on the basis of the transmission files transmitted, comprising: a process wherein the above-mentioned game terminal device generates a transmission file which includes a unique identification code and game data and sends the file to the above-mentioned server; and a process wherein the above-mentioned server checks the identification code of the transmission file received and appends the received transmission file to the accepted transmission file group, when a file containing the same identification code does not appear in the group of accepted transmission files.

Such a constitution makes it possible to prevent double registration by the same participant.

Also, the data communication method for game systems relating to the present invention is a data communication method for game systems for transmitting transmission files including game data from each of a plurality of game terminal devices to a server, and carrying out competitions on the server on the basis of the transmission files transmitted, comprising: a process wherein the above-mentioned game terminal device generates a transmission file which includes game data and sends the file to the above-mentioned server; and a process wherein the above-mentioned server checks whether information prohibiting registration is recorded in the received transmission file and appends the received transmission file to the accepted transmission file group when information prohibiting registration is not recorded therein.

Furthermore, the data communication method for game systems relating to the present invention comprises: a process wherein the above-mentioned server carries out the competitions on the basis of each of the transmission files in the above-mentioned transmission file group and discloses the results of the competition; a process wherein the above-mentioned game terminal device requests the acquisition of a transmission file in the above-mentioned transmission file group from the above-mentioned server; and a process wherein the above-mentioned server writes to the corresponding transmission files information prohibiting addition to the above-mentioned accepted transmission file group and sends the files to the above-mentioned game terminal devices.

Such a constitution makes it possible to eliminate inappropriate registration with another person's team data downloaded from the server.

Also, the data communication method for game systems relating to the present invention is a data communication method for game systems for transmitting transmission files including game data from each of a plurality of game terminal devices to a server, and carrying out competition on the server on the basis of the transmission files transmitted, comprising: a process wherein the above-mentioned game terminal device generates a transmission file including a unique identification code and game data and sends the file to the above-mentioned server; a process wherein the above-mentioned server checks the identification code of the transmission file received and appends the received transmission file to the registration file when a file containing the same identification code does not appear in the registration file including the group of accepted transmission files and information prohibiting registration to a registration file is not written therein; a process wherein the above-mentioned server carries out the competition on the basis of the transmission files of each team registered in the above-mentioned registration file and discloses the results of the competition; a process wherein the above-mentioned game terminal device requests the acquisition of the transmission file of any team from the above-mentioned server; and a process wherein the above-mentioned server writes information prohibiting the corresponding transmission file from being registered at the above-mentioned registration file and sends the file to the above-mentioned game terminal device.

Such a constitution makes it possible to eliminate double registration by the same person and registration with another person's data.

Preferably, the above-mentioned identification code is assigned to each game terminal device by the server. The server thereby becomes able to identify each game terminal accessing the server via a network; moreover, the constitution of an accounting system for participation in game meets becomes simple.

Preferably, the above-mentioned identification code includes any of the following: game device serial number, e-mail address, login ID, or password.

The present invention is a data communication method for game systems wherein transmission files including game data are sent to a server from each of a plurality of game terminal devices and competitions are carried out on the server on the basis of the transmission files sent, comprising: a process of the server for carrying out a plurality of the competitions. and stores data of the final results as well as the intermediate results of the competitions; and a process for providing each of a plurality of game terminal devices with the final and intermediate results of the competitions with a time difference.

Also, the present invention is a data communication system for game systems including a plurality of game terminal devices, from each of these game devices transmission files being sent, and a server for carrying out competitions on the basis of the transmission files sent, wherein the server comprises a game performance means for carrying out a plurality of the competitions, a storage means for storing the final results as well as the intermediate results of the competitions, and a data provision means for providing each of a plurality of game terminal devices with the final and intermediate results of the competitions with a time difference.

In one embodiment of the present invention, the game performance means carries out a plurality of the competitions at one time and the data provision means provides the game terminal devices with the final and intermediate results of the competitions in the order of day, week, month, and year respectively.

Moreover, in another embodiment of the present invention, the game performance means carries out a plurality of the competitions including preliminary and final competitions, and the data provision means, after providing the game terminal devices with the results of the preliminary competition, provides the game terminal devices with the results of the final competition as a day, week, month, and year pass.

Furthermore, in the other embodiment of the present invention, the game performance means makes the storage means store the progress data of the competitions.

And yet, the present invention is a program or a storage medium stored with the program, for making the server and/or game terminal perform the data communication method.

BRIEF DESCRIPTION OF THE DRAWINGS

FIG. 6 is a flowchart to explain the overall flow of a game meet;

Figure 14:
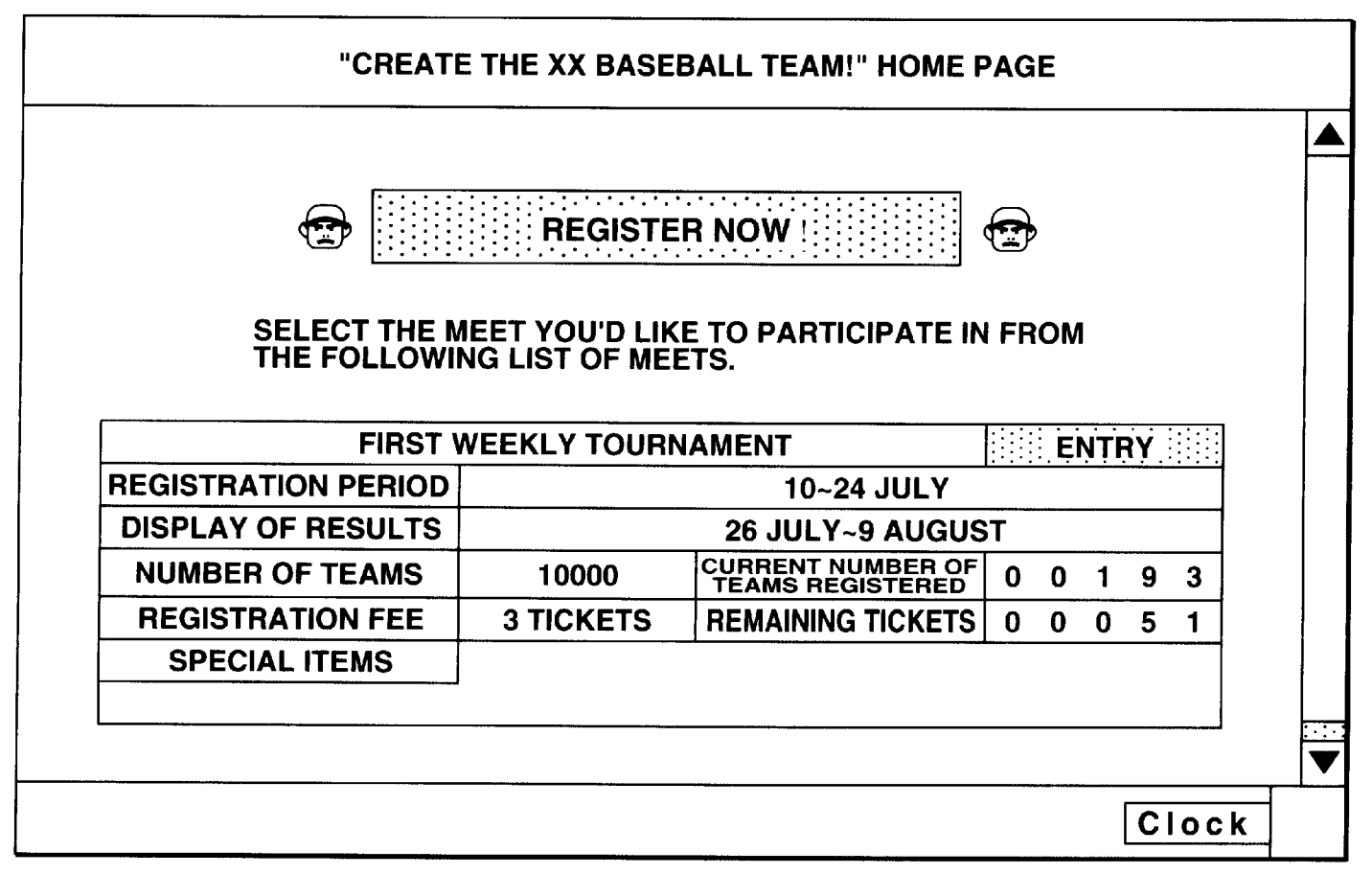

FIG. 14 is a drawing to explain a meet selection screen;

FIG. 24 is a schedule indicating the manner of displaying the results of the competitions on the server.

DESCRIPTION OF THE PREFERRED EMBODIMENTS

Figure 1:
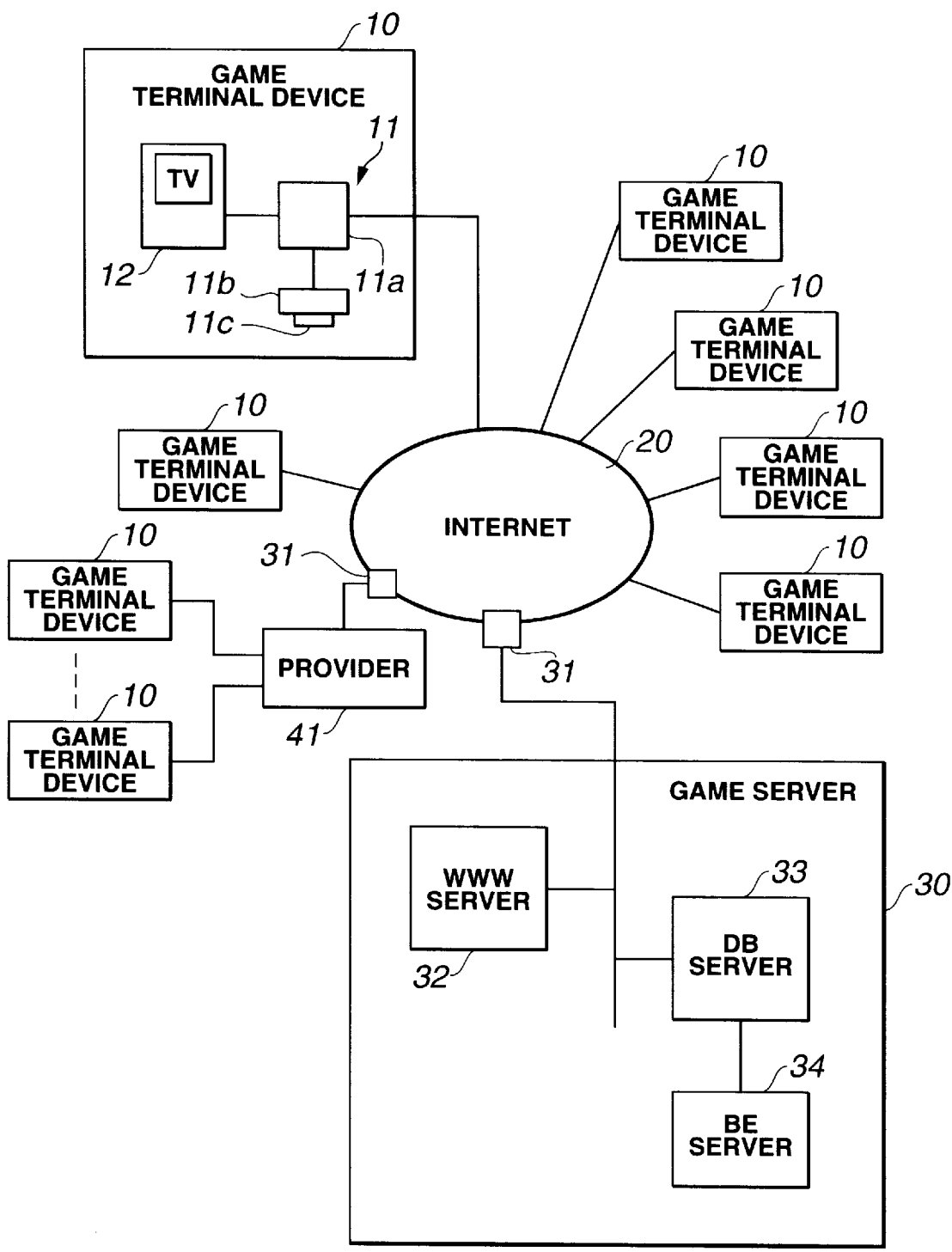
FIG. 1 is a drawing to explain the overall constitution of the game system employing the present invention.

The preferred embodiments of the present invention are explained below with reference to the drawings. The overall constitution of the game system is explained with reference to FIG. 1.

Figure 2A:
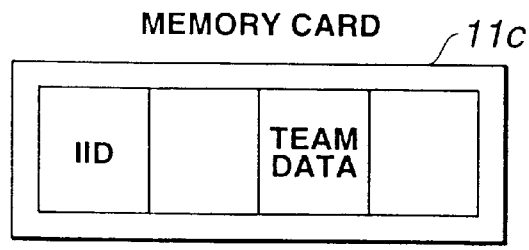
FIG. 2A is a drawing to explain the plurality of storage areas of a memory card.

The game system generally comprises a game terminal device 10, a network 20, and game server device 30. The terminal device 10 includes a game device 11 and a screen device (television monitor) 12. The game device 11 is constituted of a game device body 11a, peripheral devices 11b such as a game controller and keyboard, a memory card 11c for holding game data or the like, and so forth. A communications interface is housed in the game device body and causes the game device 11 to function as a terminal device for carrying out data communications with the game server 30 via a communications network, such as the Internet 20. The game device 11 is able to connect to the Internet via a provider 41 for providing internet connection services with a dial-up connection or by a direct connection to the Internet. Moreover, as discussed below, the installer of the game server 30 may also be a provider 41 of internet connection services to make possible a dial-up connection for the game terminal 10. When a power source is applied, the game device 11 reads the startup program in the boot ROM installed therein and displays the initial screen. When the player places an information-storing medium containing an OS, game program, or data, such as a CD-ROM in the body, the information thereof is read into the main computer system and the program is started. The program contains a reading (communications) program for accessing the WWW server discussed below. A plurality of recording areas are located in the memory card 11c as shown in FIG. 2A and a plurality of files can be recorded therein. A plurality of game terminal devices 10 of this type of constitution are connected to the game server 30 via the Internet 20.

The game server 30 includes a router 31, WWW server 32, DB (database) server 33, and BE (back end) server 34. The router 31 takes up data addressed to the WWW server 32 from an Internet line 20 and transfers the data to the WWW server. Also, the router sends data output by the WWW server 32, addressed to the specific game terminal device 10, to the Internet line 20. The WWW server 32 holds the home page of the game meet, stores various types of content such as image information and HTML files, and provides this content to the game participants. The DB server 32 container data groups such as data for teams registered for the game meet tournament (or league), data for teams that won the tournament meet, download data such as team competition data recommended by the game program developers, and match results for the tournament. The DB server provides the data contained therein on request by the WWW server 32.

Figure 3:
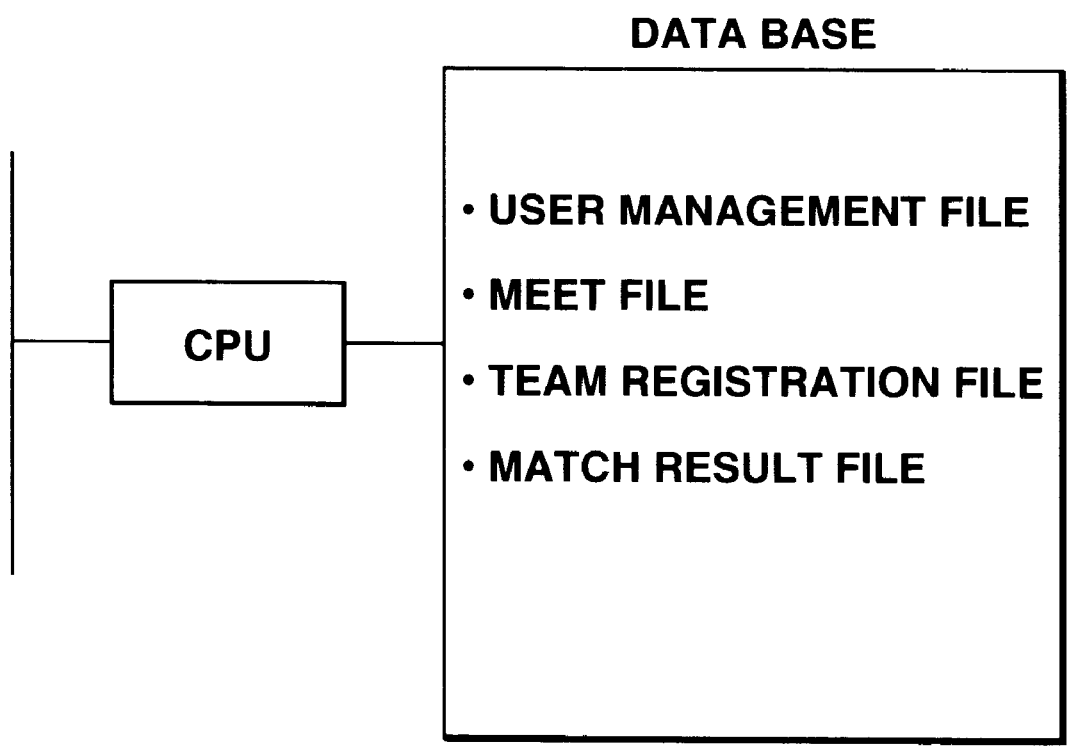
FIG. 3 is a drawing to explain each type of file stored in the DB (database) server 33.

FIG. 3 shows an example of files held in the DB server. These files include. user control files, meet files, team registration files, and match result files. A user's login (identification number), account, number of points won, and so forth are stored in the user control files. The tournament number, tournament name, number of participating registrants, maximum number of participants, entry start time, entry end time, start time for posting results, end time for posting results, results display information, registration condition flags, registration account information, and so forth are stored in the meet files. A user's login ID, flags, team data, tournament number, match result codes, final rank, home site name, and so forth are stored in the team registration files. The tournament number, match code, user login ID of the winning team, user login ID of the losing team, match result data, match codes for previous match results of the winning team, match codes for previous match results of the losing team, and so forth are stored in the match result files.

The BE server 34 reads data on each team associated with the tournament, executes a program for carrying out the match on the basis of the team data, and stores the results of the competition in the match result files on the DB server 33.

Figure 4:
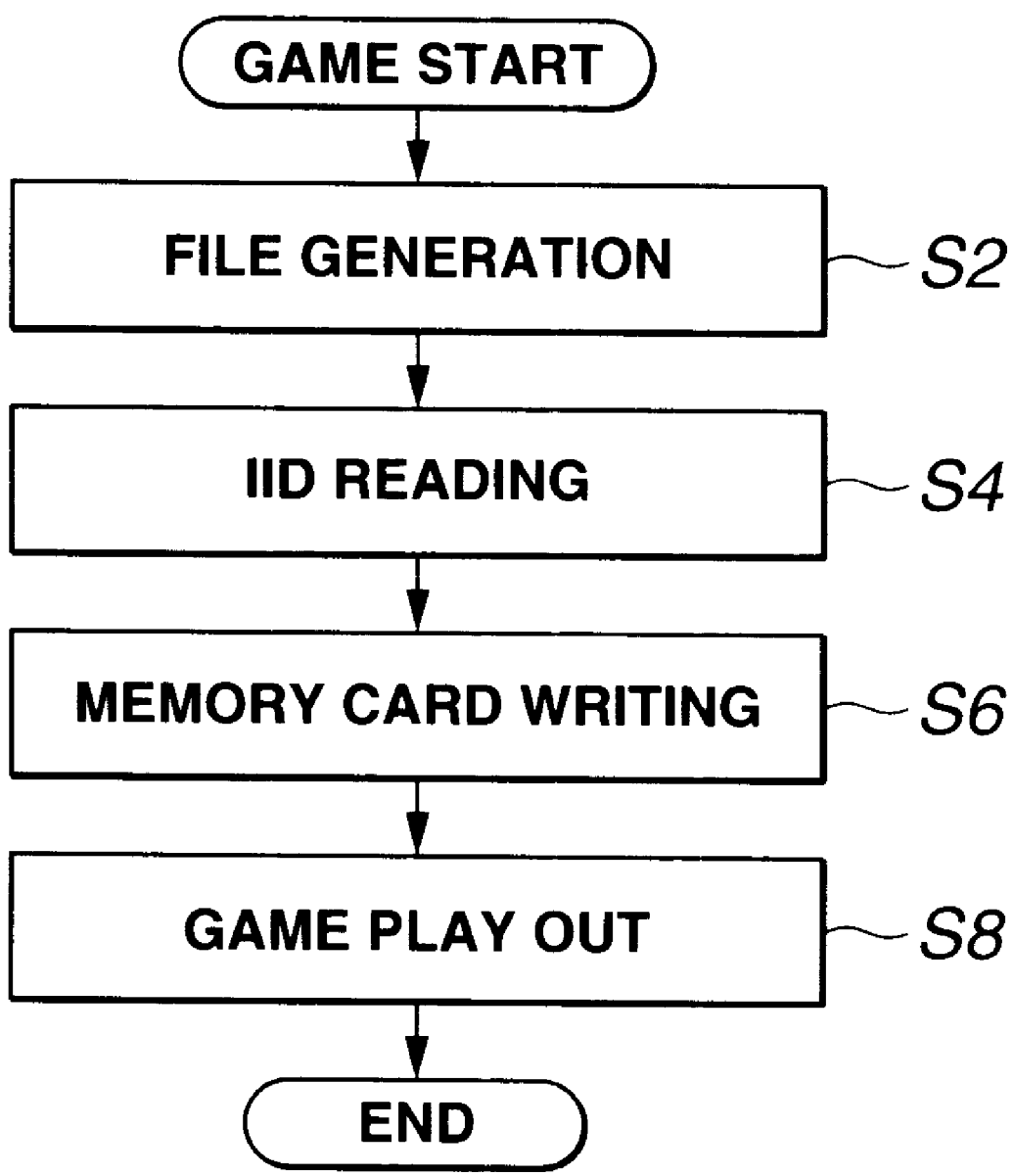
FIG. 4 is a flowchart to explain the storage of the hardware identification number in a memory card when a game is first played on the game device.
Figure 5A:
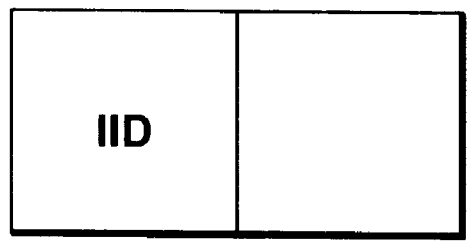
FIG. 5A is a drawing to explain the hardware identification number (IID) stored in advance in the flash memory of the game device body.

FIG. 4 is a flowchart for explaining the formation of one's own team. A player who has decided to participate in a game meet becomes the president of the organization owning the team, for example, and must form his/her own team to participate in the meet. This is effected by executing a game application on one's own game device 11 and running the game. When the game is first started, the team management data files, competition data files, and player data files are generated (S2). In the game device 11 as shown in FIG. 5A, the unique identification number (Individual ID, IID) for identifying the device itself (hardware) is stored in advance in the flash memory in the device body 11a. For example, the IID is the serial number. This is read from the flash memory of the device (S4). As shown in FIG. 2A, the IID read and the three files (team data) discussed above are held in the memory card 11C (S6). It becomes possible to distinguish the game device 11 that generated the team data due to the IID being stored together with the team data . Because the data is stored in the memory card 11c, the memory card can be used on another person's game device 11. The game progresses, one's own team data on the memory card 11c is updated, the strength of the team is improved (S8), and the offline game ends.

As discussed above, participants play the game with their own game device in advance, improve the competitive strength of their own teams, and improve the game parameters. In the case of a baseball game, for example, the game parameters of the team include management data, player data, and competition data. Management data include the IID, team ID, flag ID, owner name, home site name, manager ID, pitching coach ID, fielding coach ID, and so forth. Player data include the player ID, given name, jersey number, condition, character, popularity, spirit, strength, and for a pitcher, further include pitch type, pitch movement, pitch speed, control, and so forth, and for a fielder, further include right and left batting proficiency, long ball capability, running strength, arm strength, batting eye, reaction speed, hot zone, weak zone, and so forth. Competition data include each pitcher's numbers of wins, losses, saves, strike-outs, innings pitched, hits allowed, walks allowed, earned runs, runs allowed to opponents, home runs, a fielder's total at bats, hits, RBIs, steals, strike-outs, walks, dead balls (being hit by pitched ball), sacrifice hits, home runs, doubles, triples, errors, and so forth.

Figure 2B:
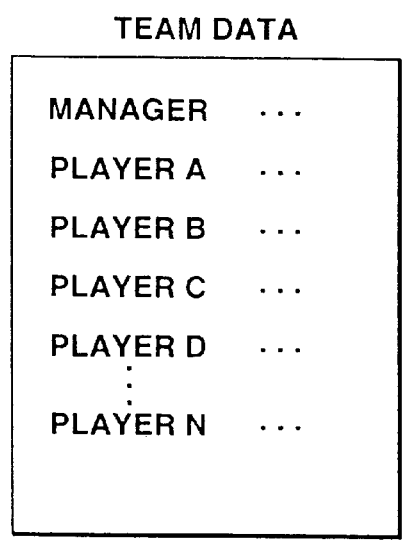
FIG. 2B is a drawing to explain team data.

This type of team data is stored in a prescribed area of the memory card 11c as shown in FIGS. 2A and 2B, for example. The memory card 11c is used in connection with the controller 11b or game device body 11a and is removable. The memory card 11c also includes non-volatile memory, including that which can carry out a simple game when provided a CPU and display device, as well as flash memory. The memory card 11c may be a commonly available item such as a game cassette or CD-R./W, and includes items with equivalent operating effects.

FIG. 6 is a flowchart to explain the overall operation of the service provided by the game server 30. The WWW server 32 conducts the holding of the game meet with the home page and recruits the participating teams. The following are posted for the purpose of conducting the meet: an outline of the tournament (or league) meet, meet title, registration period, results disclosure period, number of teams recruited, current registration figures, registration fees, special items (qualifications for participation, awards, etc.), and so forth (S12). Participants register on the home page via the Internet 20. The WWW server 32 monitors the fairness of the registration procedures and registers participating teams. The registration application and registration check are discussed below. When participating team data (game parameters) is uploaded, the data is stored in the dB server 33 (S14). When the recruiting period has passed, a tournament (or league) chart of the participating teams is formed and the order of competition is determined (S16). The DB server 33 sends the data of competing teams to the BE server 34 according to this order and conducts virtual matches. Those match results are stored in the DB server 33. This process is repeated and the winning team is determined (S18). The winning team is presented on the home page. The high ranking winners are posted on the home page with the results in a tournament tree. Also, the results of one's own team can be found by inputting a participant's password or the like. In the case of baseball, for example, the following are displayed: the opposing teams, winners and losers, score at each stage, results for each at bat, and so forth. The team data for the winning team and recommended teams can be downloaded. Participants can thereby have their own teams compete with the winning team or other teams and replay the matches in their own game devices 11 (S20). In this way, one's own team can be caused to participate in meets and the results thereof made known.

Figure 7:
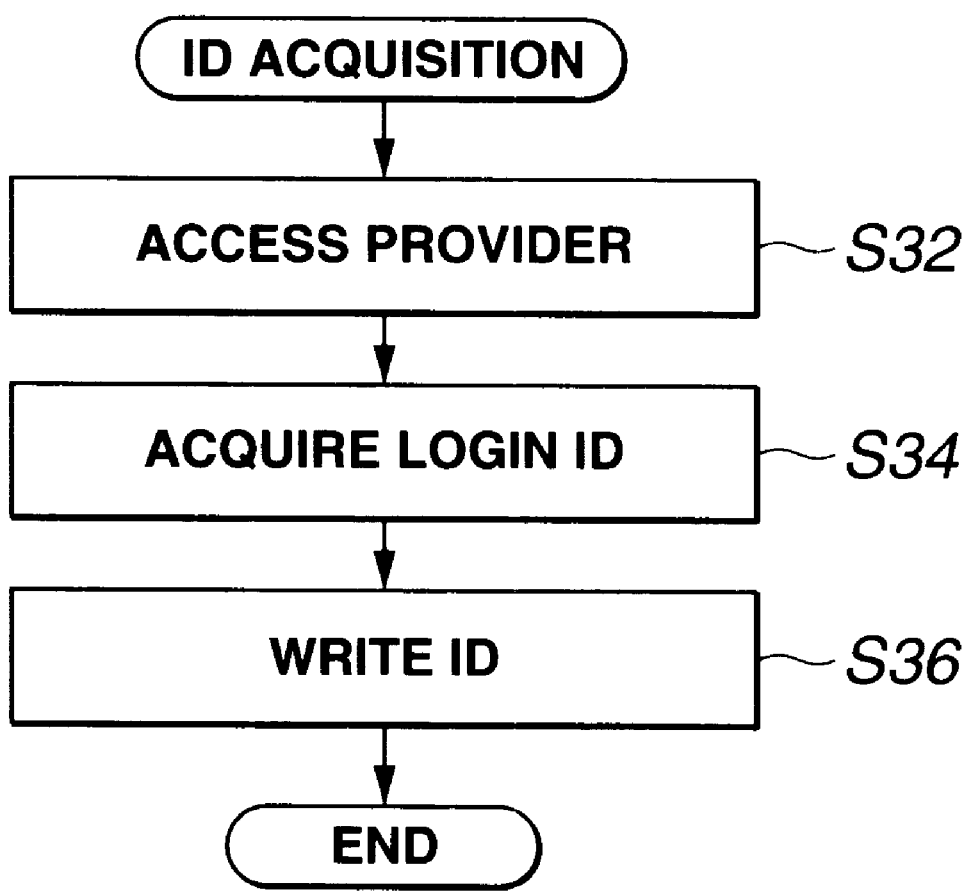
FIG. 7 is a flowchart to explain the acquisition of the login ID of a player on the network.

FIG. 7 is a flowchart showing the procedure for a person wishing to participate in a meet to get a login ID (or password) and acquire the qualifications of a participant. The login ID is used for personal identification, for example. Once a player gets a login ID, he or she can use the login ID in every meet.

Figure 5B:
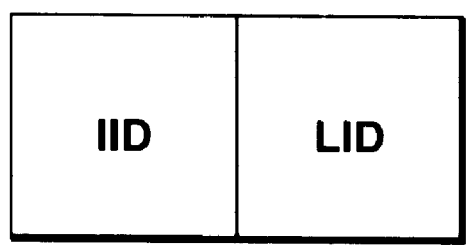
FIG. 5B is a drawing to explain the login ID (LID) being written to the flash memory of the game device body.

A login ID can be acquired from a specific provider 41, for example, a provider 41 that is related to the installer of the game server 30. Many players connect to the Internet with a dial-up connection and access the game server 30. Then, the players first access the provider 41 (S32), sign a service agreement, and acquire a login ID (S34). The login ID may be an e-mail address, for example. The login ID (LID) is written to the flash memory in the game device body (S36) as shown in FIG. 5B. Moreover, the login ID may be provided by the server 32.

Figure 8:
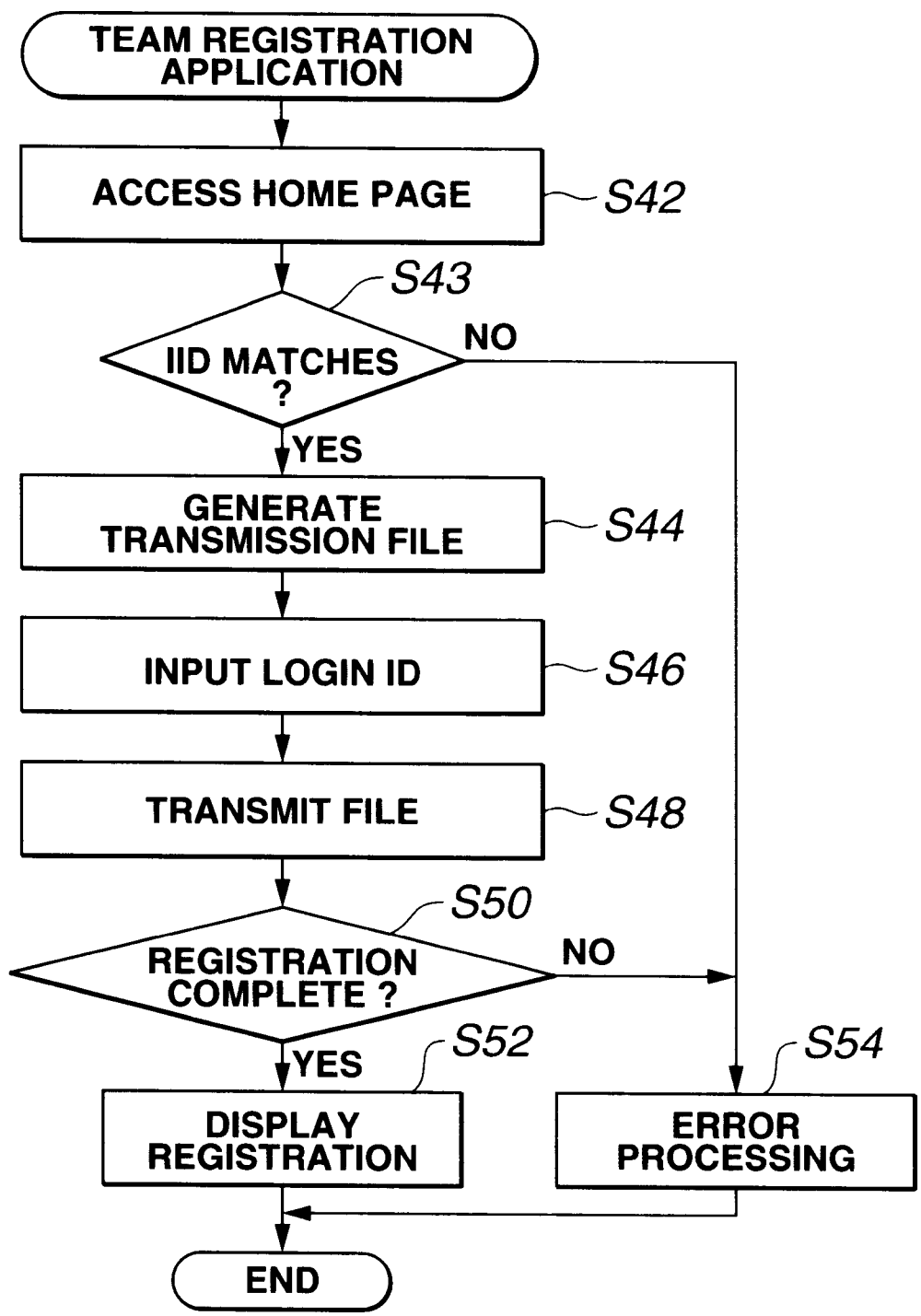
FIG. 8 is a flowchart to explain the registration of a team for a game meet in the game device.
Figure 10:
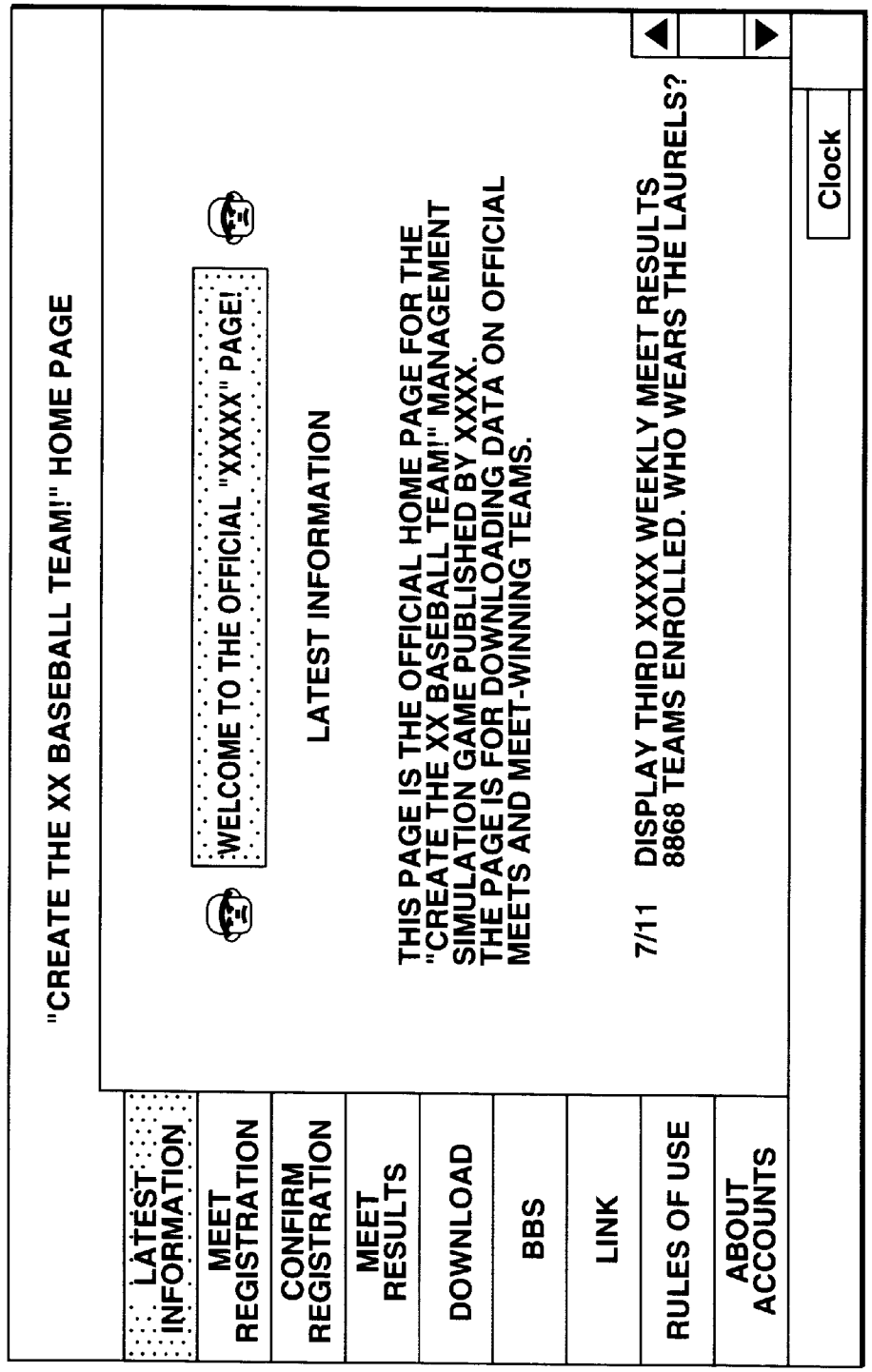
FIG. 10 is a drawing to explain an example of a home page of a game server.
Figure 11:
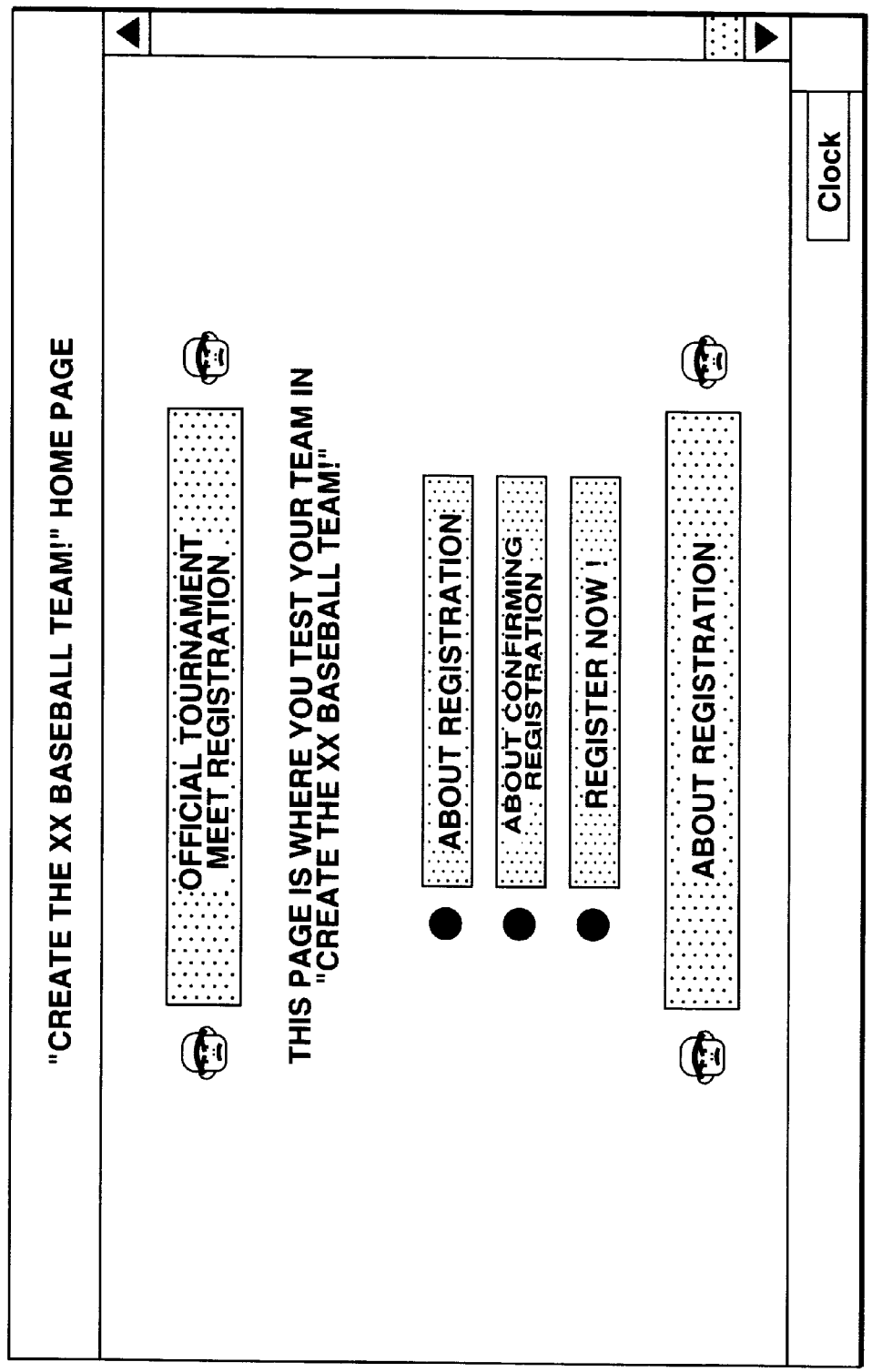
FIG. 11 is an explanatory drawing showing an example of a home page for meet registration.
Figure 12:
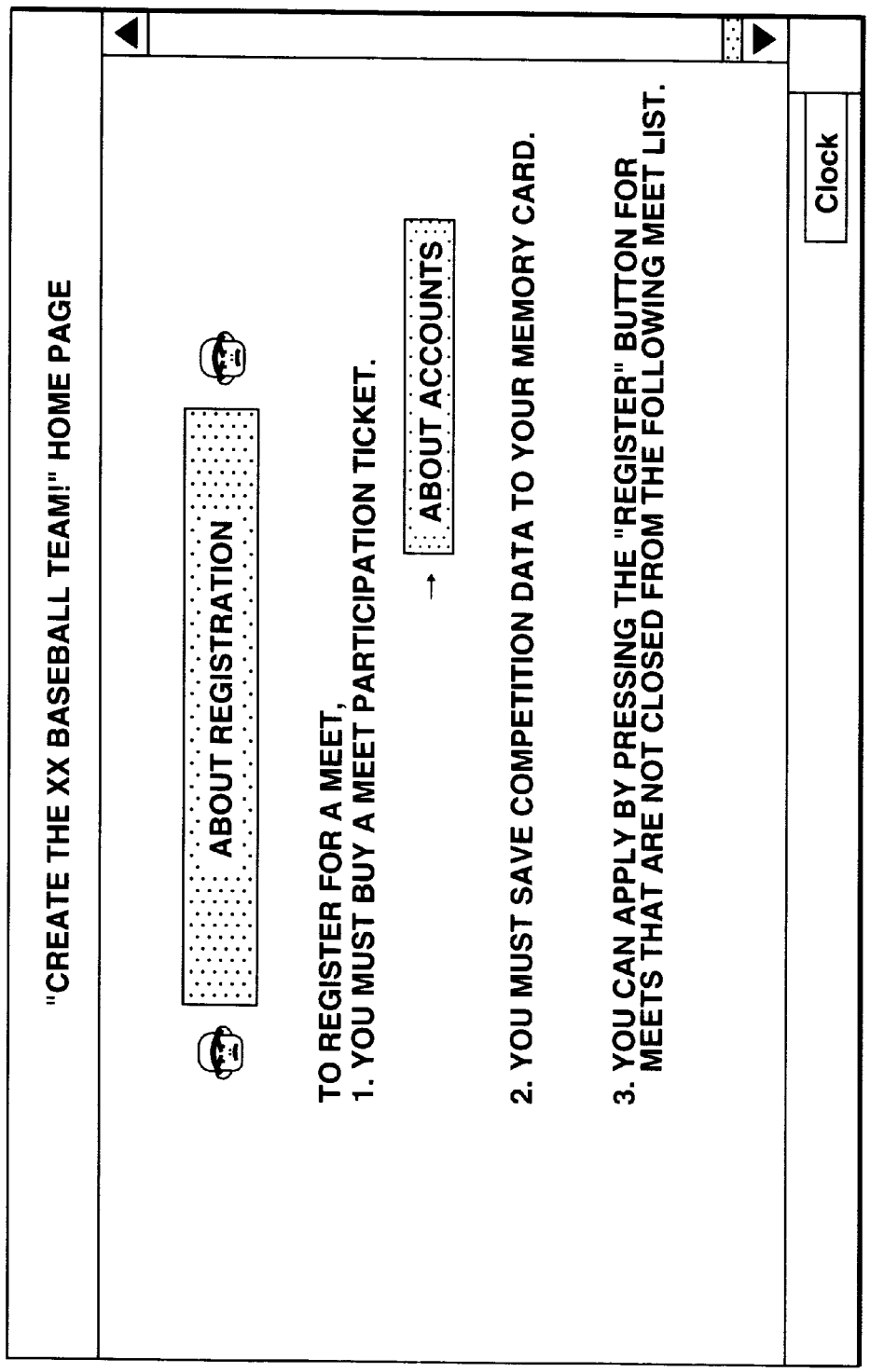
FIG. 12 is a drawing to explain the registration prompting screen.
Figure 13:
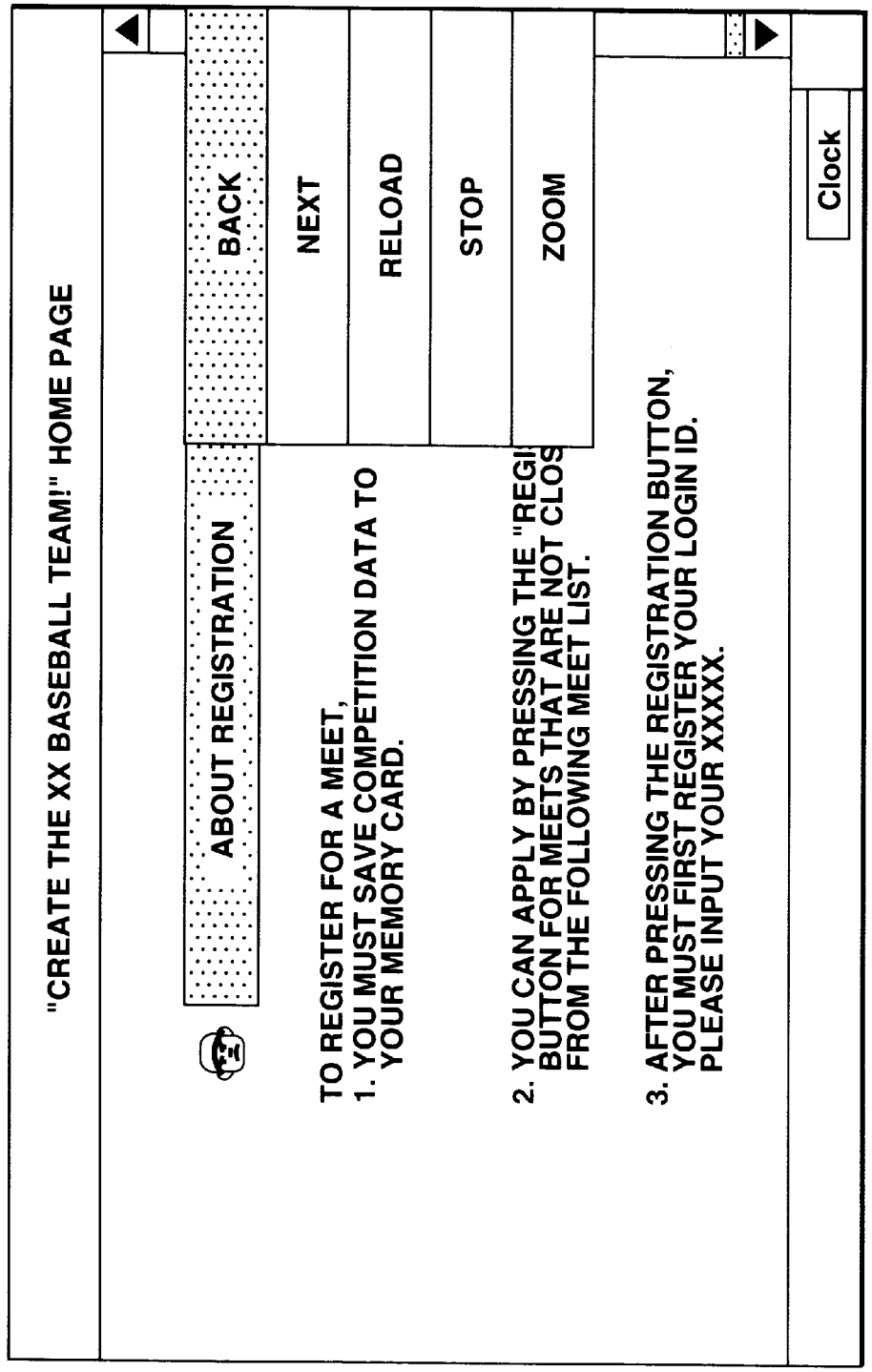
FIG. 13 is a drawing to explain the registration prompting screen.
Figure 15:
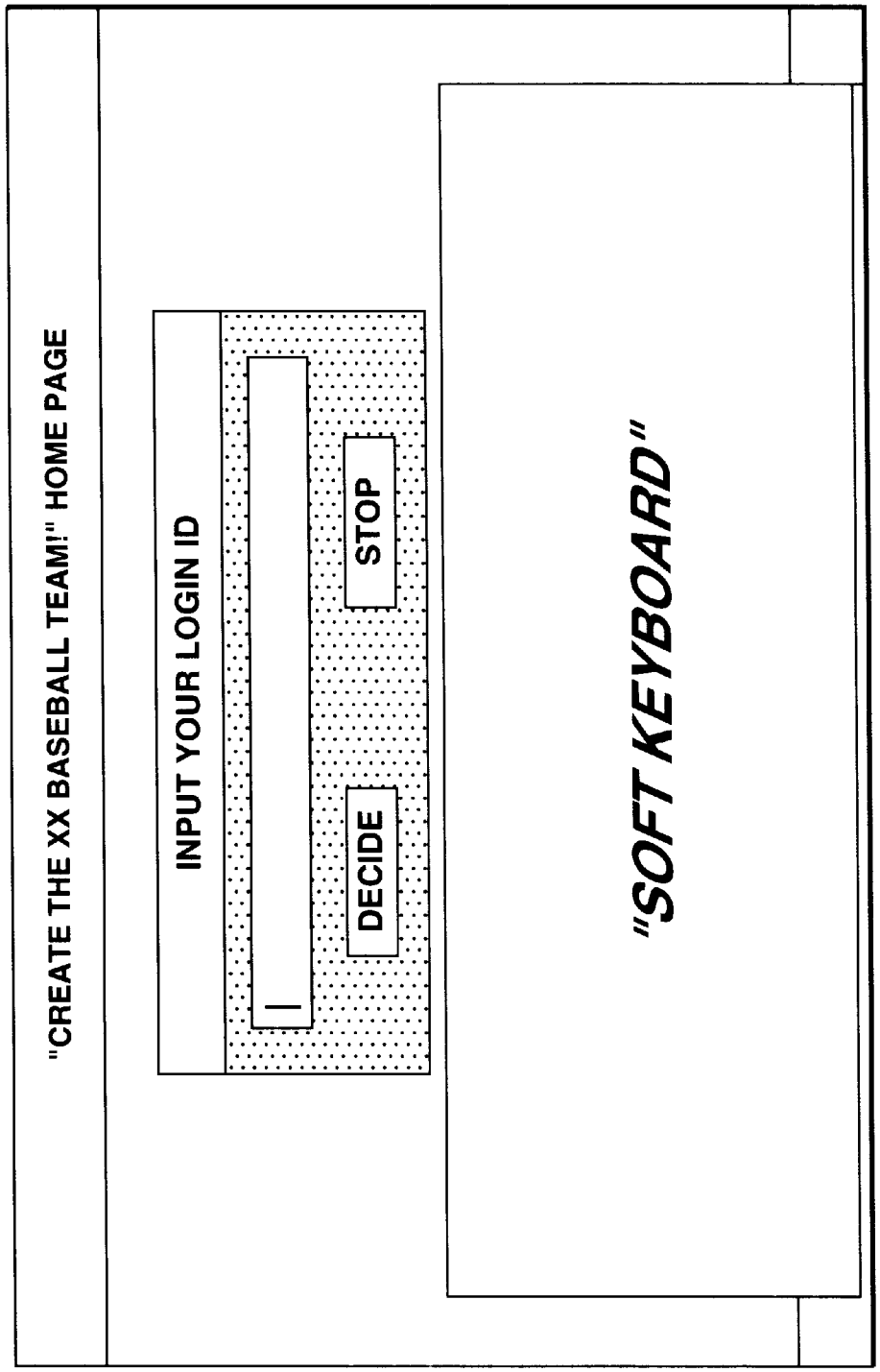
FIG. 15 is an explanatory drawing showing an example of a screen for inputting a login ID.

FIG. 8 is a flowchart showing the procedure for players to participate in a meet. When a player has his/her own team, such as a baseball team, participate in a meet, a player connects the memory card to the controller, places a CD-ROM with the baseball game (application) in the game device body 11a, and starts the application. This CD-ROM includes the software for reading the home page. The reading software is part of the baseball game or is constituted separately. For example, the reading software starts when the home page for the baseball game is selected from the menu for the baseball game displayed on the television monitor 12. The game device 11 is connected to the Internet 20 and the home page for the meet is displayed as shown in FIG. 10 (S42).

The game device 11 compares the IID in the flash ROM with the IID recorded in the team data (management data) held in the memory card 11c to determine whether the game data was prepared on one's own game device (S43). In the case where the IIDs stored do not match, it is possible that the game data was not prepared with the individual player's game device (S43, No); as a result, the error processing discussed below is effected and the process terminates (S54).

When the IIDs match (S43, Yes), data transmission from one's own game device is identified. Baseball team data is extracted from the connected memory card. In the case where a plurality of memory cards are connected, the game device 11 displays the memory cards on the television monitor 12. The player is able to select the memory card storing team data with the menu displayed on the screen using the controller 11b. The game device 11 reads files storing one's team data (game parameters) discussed above from the memory card 11c. Also, the game device reads the login ID stored in the flash memory housed therein. The game device forms a transmission file including the login ID, team data, and flag data. As discussed below, the flag data is read by the server in order to prevent fraudulent copying or the like (S44).

Figure 16:
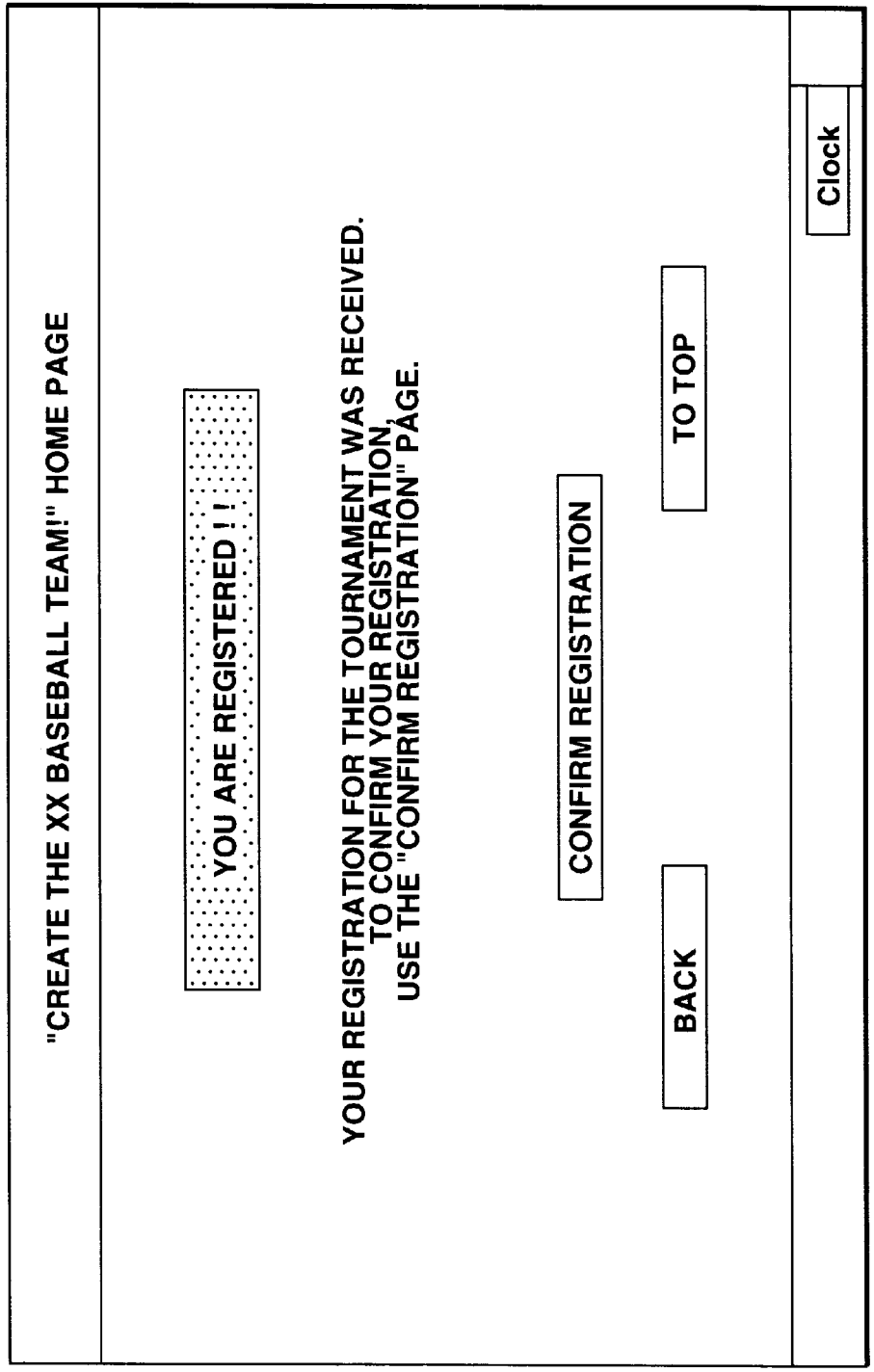
FIG. 16 is an explanatory drawing showing an example of a screen for indicating that registration is complete.
Figure 17:
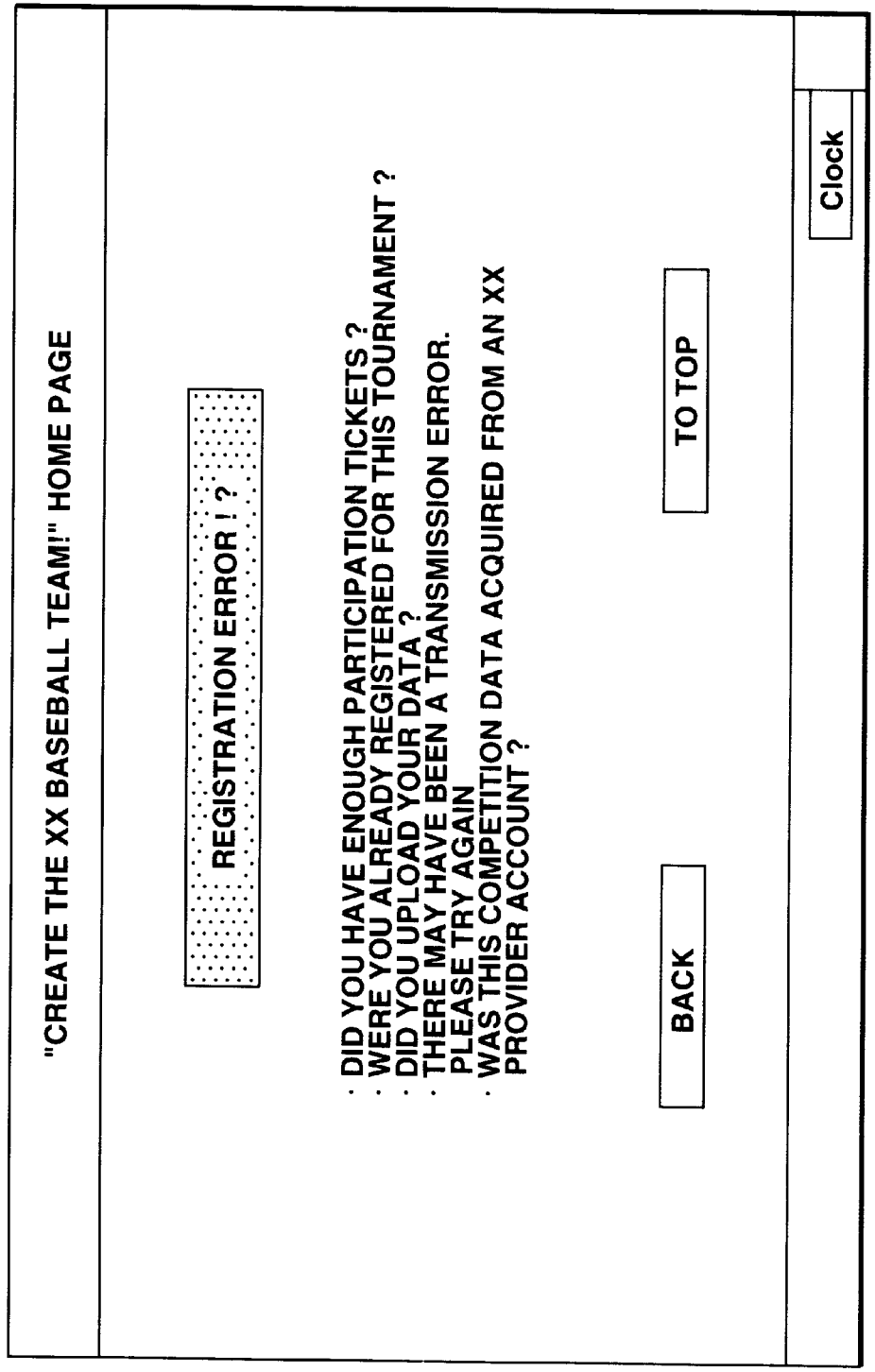
FIG. 17 is an explanatory drawing showing an example of a prompting screen in the case of a registration error.

As shown in FIGS. 10 through 15 inclusive, the player goes into the guide for "meet registration" on the home page and selects the meet in which to participate through the prompting. The player inputs the login ID (or password) and selects "decide" (S46). The file of team data is thereby sent from the player's game device to the WWW server 32 (S48). The WWW server 32 searches the file for prescribed items, discussed below, and when there are no errors, returns a registration completion to the game device 11. When there are errors, the errors are returned to the game device 11. Upon receiving a registration completion (S50, Yes), the game device 11 displays this status on the screen of the television monitor 12 as shown in FIG. 16. As necessary, the registration meet name is recorded in the memory card and team registration is ended (S52). In the case of non-matching IIDs (S43, No) and in the case of receiving errors from the WWW server 32 (S50, No), the game device 11 displays the registration error on the monitor screen as shown in FIG. 17, for example, effects the error processing (S54) to display the cause of the error, and ends the process.

Figure 9:
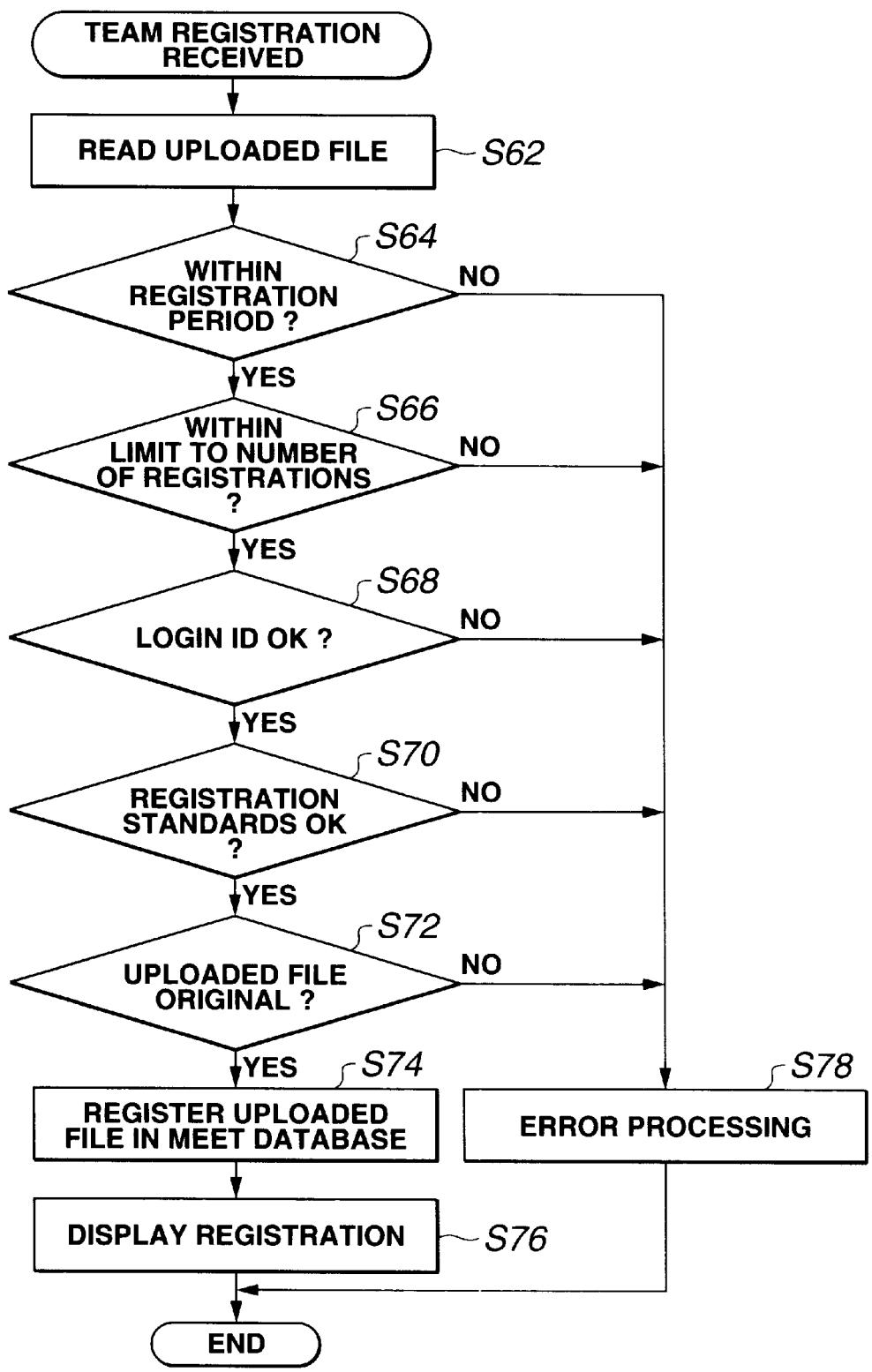
FIG. 9 is a flowchart to explain the reception of team registration in the WWW server 32.

FIG. 9 is a flowchart to explain the registration processing for a team participating in the meet that is executed by the WWW server 32.

The file sent from the game device 11 to the WWW server 32 is stored once in buffer memory, not shown. The WWW server 32 reads the file uploaded from the game device 11 and carries out a check (S62).

The WWW server 32 determines whether the registration period (see FIG. 12) for the meet for which the player applied has passed. If it has passed (S63, No), this is an inappropriate application; as a result, error processing is effected such that a message to that effect is returned to the game device (S78).

In the case where the registration period is ongoing (S64, Yes), the WWW server 32 determines whether recruitment is still within the limit (limit to the number of registrations). In the case where the limit is exceeded (S66, No), error processing is effected such that a message to the effect that the participating teams have reached the recruitment limit is returned to the game device (S78).

When the recruitment limit is not reached (S66, Yes), it is checked whether an ID that is identical to the login ID of the player has already been registered in the database (team registration file) for teams registered for the meet. The login ID is isolated from the pertinent portion of the file sent from the game device. This login ID is read from the flash memory of the game device and written to the transmission file; therefore, the player cannot alter this ID.

When registration has already occurred(S68, Yes), error processing is effected, such that a message to the effect the multiple participation is not allowed is sent to the game device, in order to prevent double registration (S78).

In the case when a login ID identical to the player's login ID is not registered in the database of teams registered for the meet (S68, No), it is determined whether the player satisfies the registration requirements such as game participation qualifications (S70). The participation qualifications include an account balance for the participation registration fee. When the registration requirements are not satisfied (S70, No), error processing is effected such that a message to the effect that the requirements are not met is returned to the game device (S78).

When the registration requirements are satisfied (S70, Yes), it is determined whether the uploaded file is the original file (data) (S72). Registration with game data that is not the player's own data is prohibited. This can be determined according to whether the copying-prohibited flag, in the flags in the transmission file, is set. The copying-prohibited flag is set to ON when the competition data is downloaded to the game device from the game server 30 (see FIG. 21 discussed below). When the uploaded file does not comprise original game parameters (S72, No), error processing is effected such that a message to that effect is returned to the game device (S78).

When the uploaded file is original game parameters (S72, Yes), this file is registered in the database for the baseball meet (team registration file). The registration completion (see FIG. 16) is sent to the game device (S76). Team registration is completed in this way.

Figure 18:
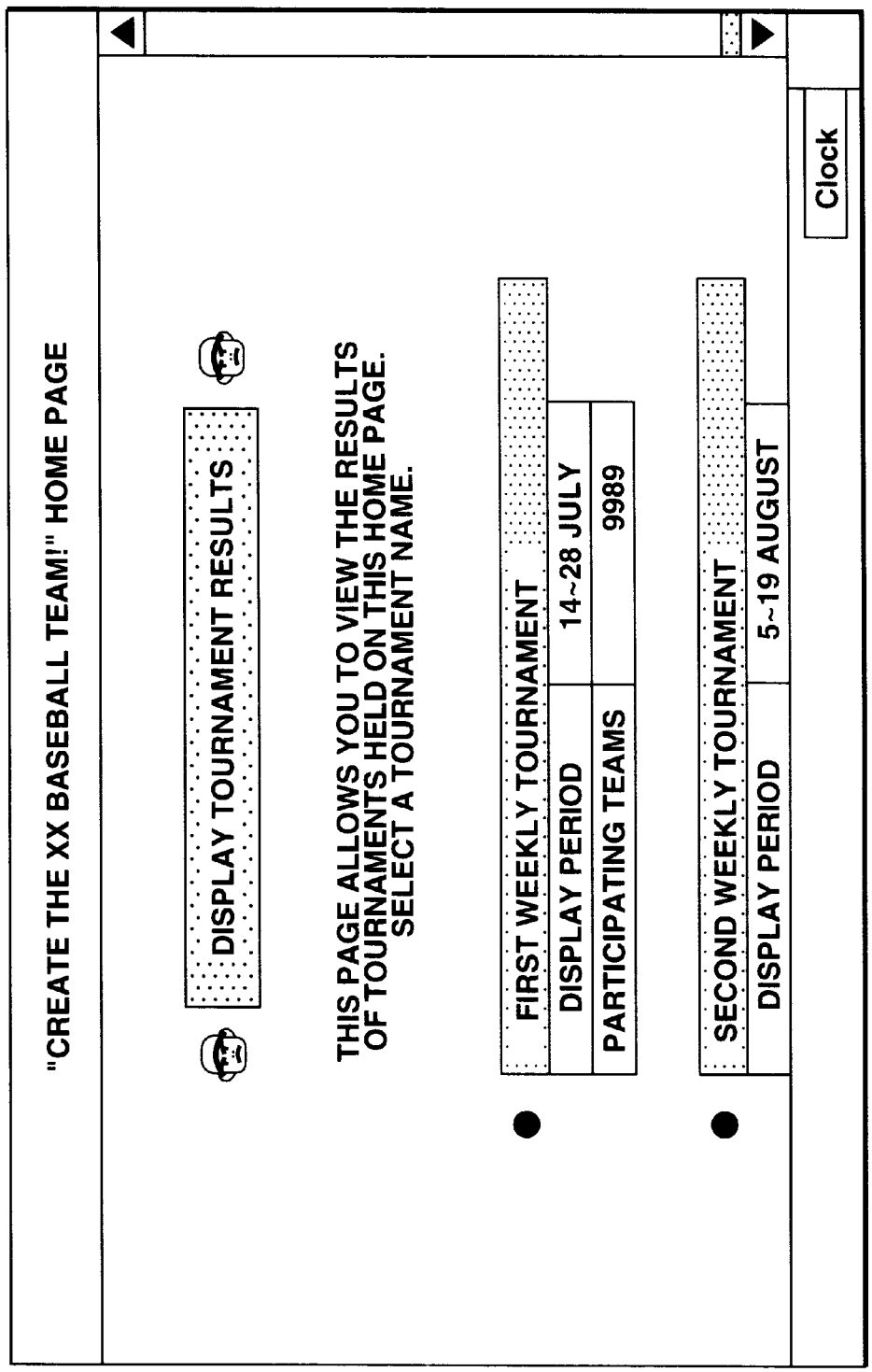
FIG. 18 is an explanatory drawing showing an example of a screen for presenting the results of a tournament meet.
Figure 19:
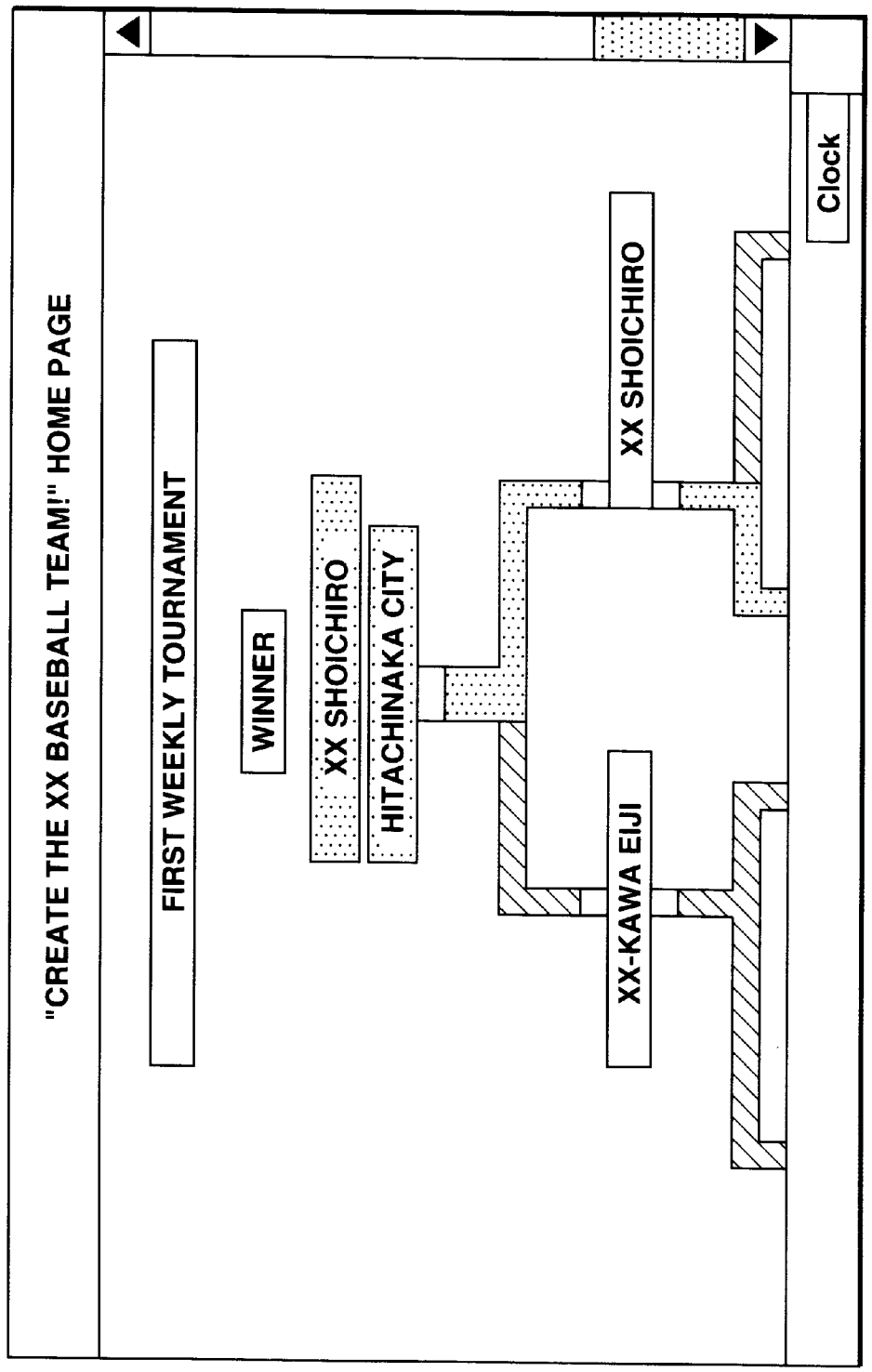
FIG. 19 is an explanatory drawing showing the best eight of a tournament.
Figure 20:
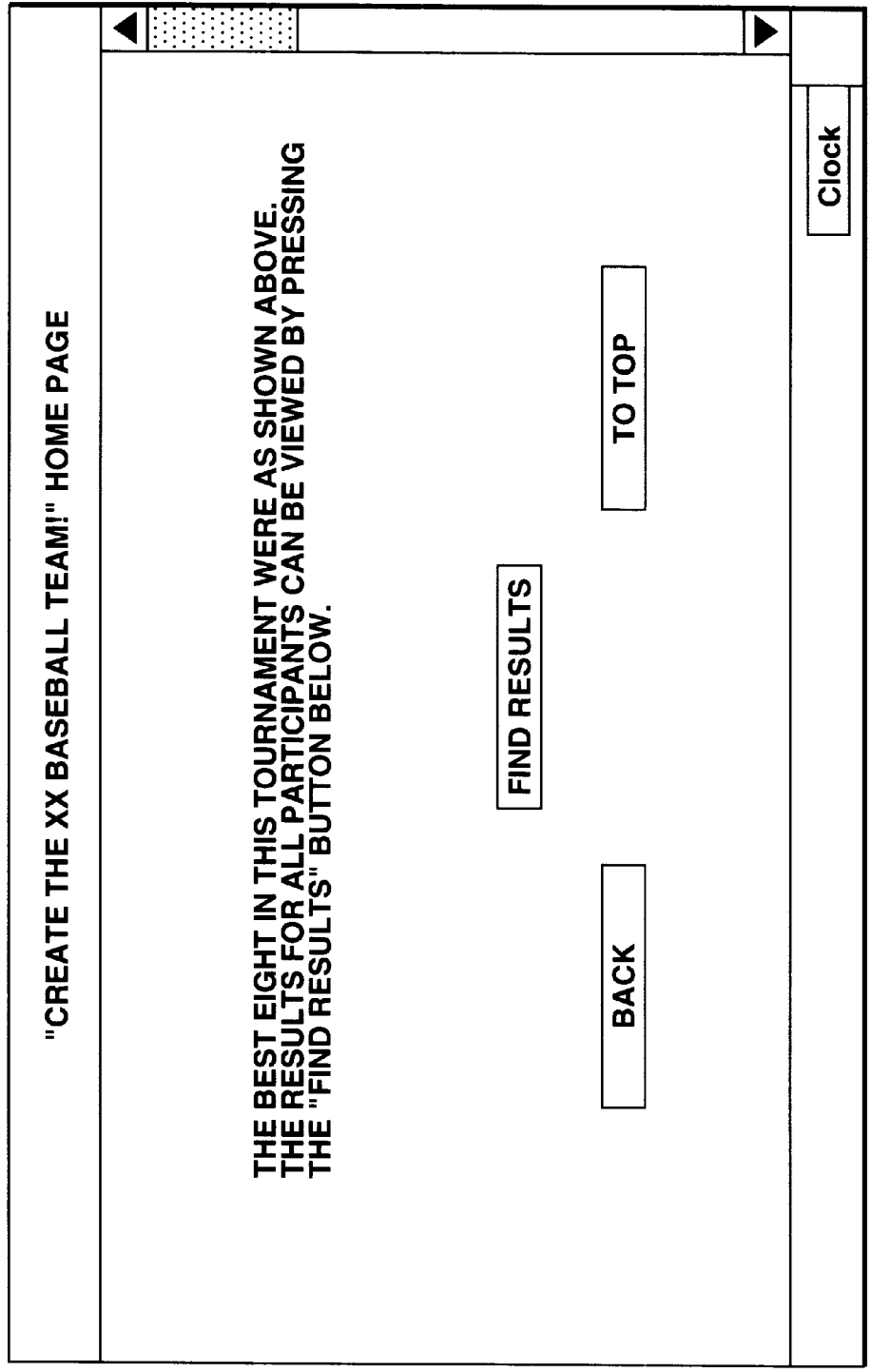
FIG. 20 is an explanatory drawing showing a search screen.
Figure 21:
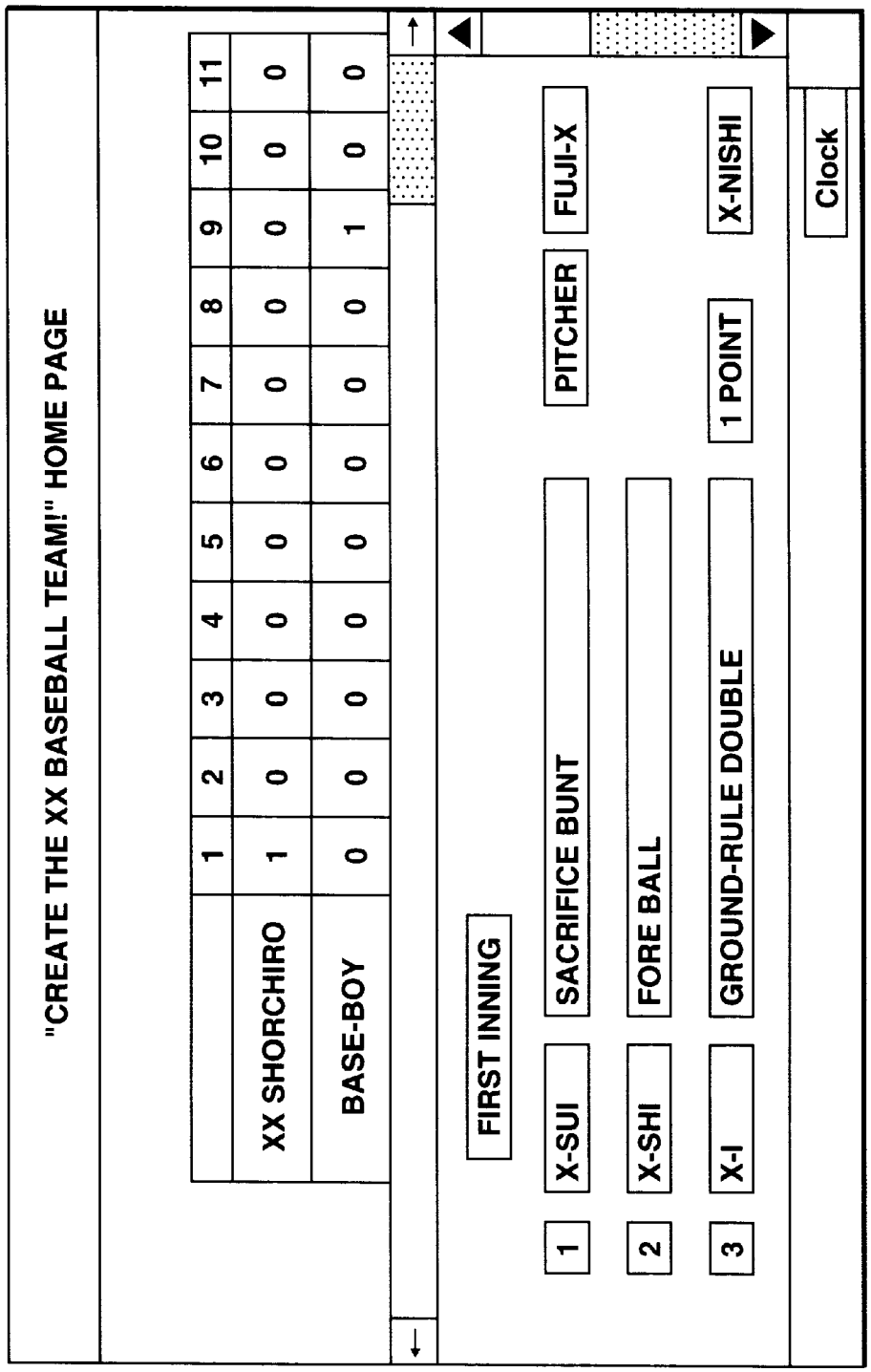
FIG. 21 is an explanatory drawing showing an example of the progress of a match.

After the recruitment period of the meet has passed, the BE server 33 carries out the competition for each team and displays the results on the home page. Upon the selection of "meet results" on the home page shown in FIG. 10, the results of the tournament meet are displayed as shown in FIG. 18. When tournament verification is selected, the best eight tournament results are displayed as shown in FIG. 19. When FIG. 19 is scrolled to the lower portion, the screen shown in FIG. 20 is displayed. The participant selects "search" and inputs his/her own, previously registered login ID (See FIG. 15), whereupon the participant can search the match results for his/her own team. The match results for one's own team are displayed as shown in FIG. 21, for example.

Regarding how the competitions are carried out, there is a case where BE server carries out each match of a tournament one by one, and there is a case where BE server carries out the calculation processing for all the matches of a tournament at one time.

Figure 23:
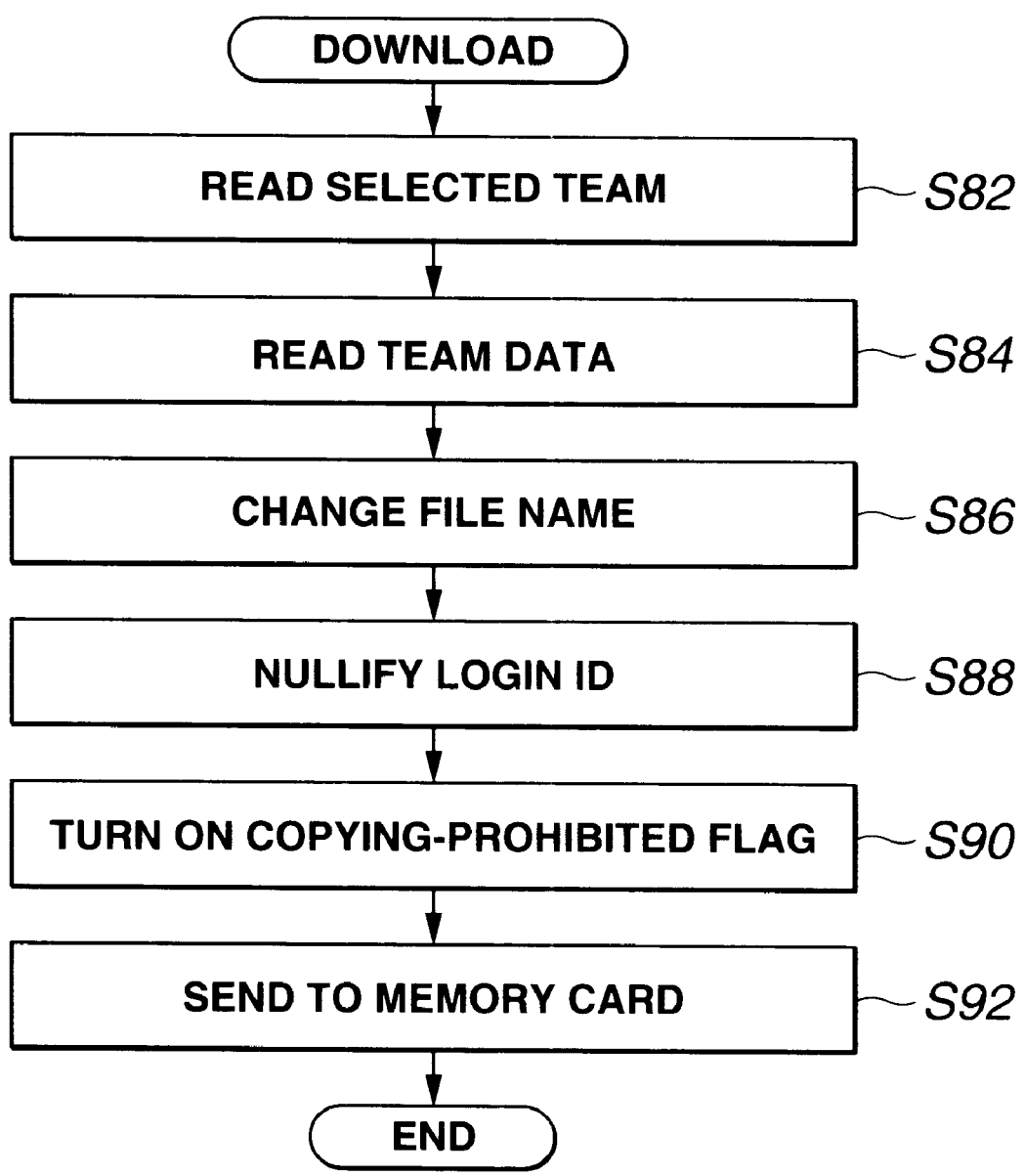
FIG. 23 is a flowchart explaining the download procedure.

FIG. 23 is a flowchart for explaining the procedure wherein the WWW server 32 records (downloads) game data from the database in the memory card 11c of the game device 11.

Here, the meet can be performed in 2 ways as follows. In one way, the BE server performs each of the tournament matches one by one, in the other way, the BE server performs all of the calculation processings for each of the matches of the tournament at one time.

Figure 22:
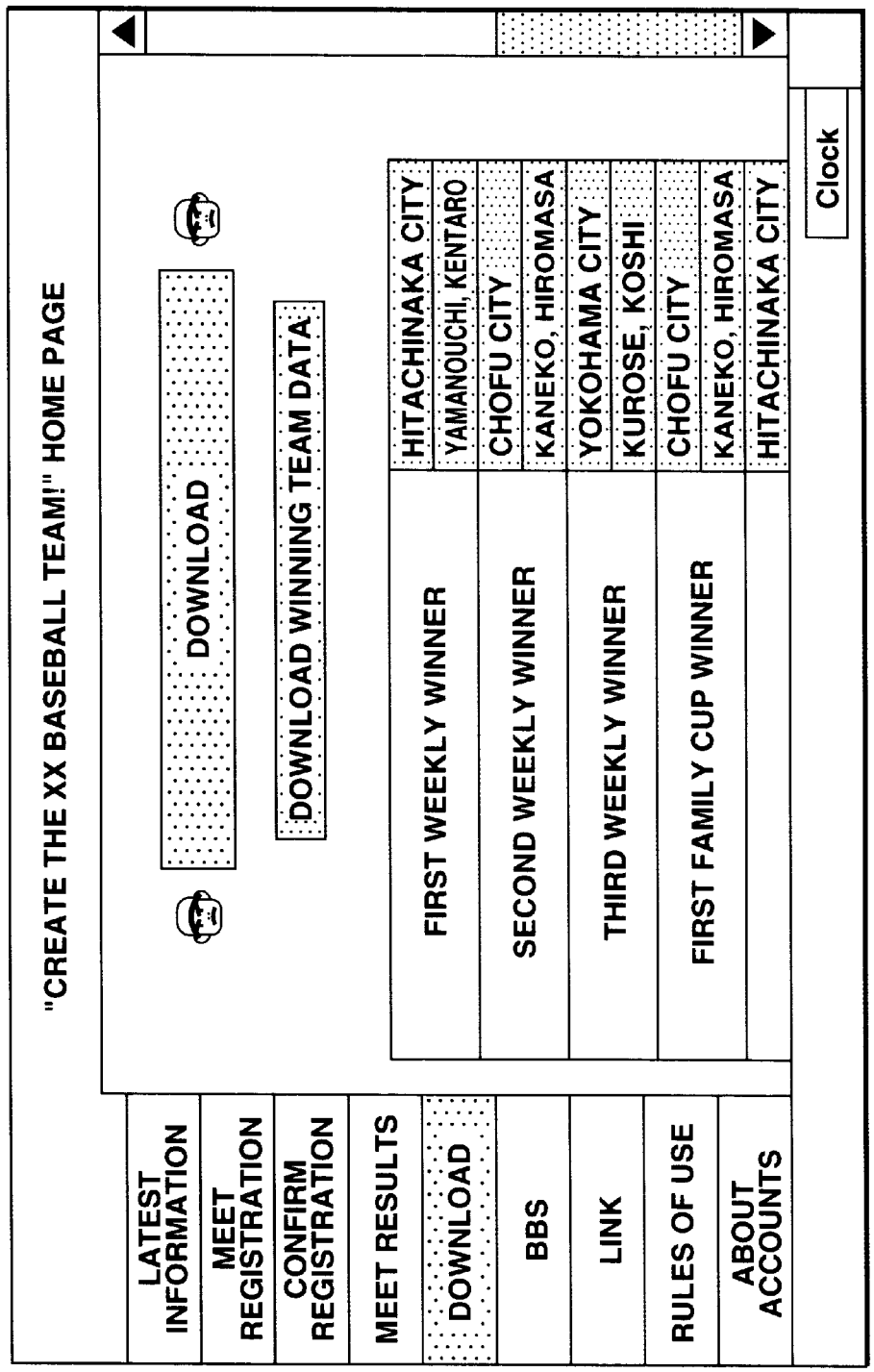
FIG. 22 is an explanatory drawing showing an example of a screen for downloading the data of a winner's team.

When a player selects "download" at the home page in FIG. 10, the screen shown in FIG. 22 is displayed. When the player selects the name of the winner of each meet, the WWW server 32 is instructed to download the game data for that team.

Figure 2C:
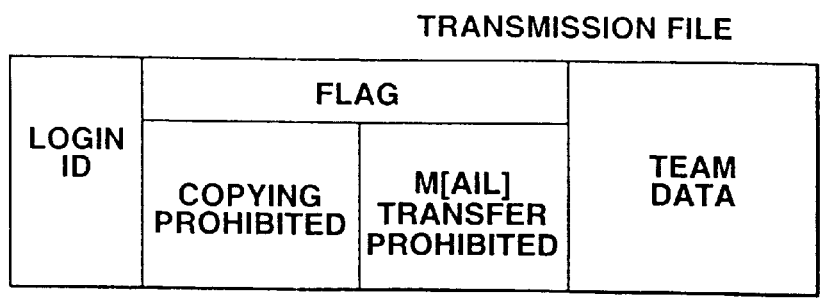
FIG. 2C is a drawing to explain an example of the constitution of the transmission file.

The WWW server 32 reads in the selected team (S82) and reads the pertinent team data from the DB server 33 (S84). The file name for this team data is changed to be different from the file name prepared by the winner, such as "XX meet winner" (S86). The login ID for the team data file of the winning team is removed (nullified) (S88) and the copying-prohibited flag prohibiting copying is set in the flag area (S90). Also, as necessary, mail acquisition-prohibiting flag, for prohibiting transfer by e-mail, is set on (see FIG. 2C). In this way, team data are processed and a transfer file is formed and made into a format that can be stored in the memory card 11c of the player and sent to the game device 11. The player can provide downloaded game data and the game data of his/her own team to the application on his/her own game device 11, and replay the competition.

When a player uploads the above-mentioned file wherein the login ID of the file was nullified as his/her own team data to the WWW server 32, the player is dropped from the participants because of the null login ID in the registration reception step S68. Also, participating in a meet using another person's data is prevented in step S72 by. setting on the copying-prohibited flag. Building one's own team data on the basis of acquired team data and registering in a meet is prevented in step S72.

In this way, with the embodiment of the present invention, when a game device runs a game application and forms data for a team, the identification code (IID) of the game device body is included in the data and stored in the memory card. When the game device is connected to the Internet, a login ID is written to the game device. When transmission data is formed using the data in the memory card, the formation of the transmission data is not effected when the IID in the data does not match the IID of the game device body. Replacing the memory card and entering in a meet from another game device is prevented thereby and entering a meet can be authorized only with the game device that generated the game data. Also, when files are transmitted, the login ID is read in from the game device, included in the transmission data, and sent to the game server. It thereby becomes possible to eliminate double registration to the game server from the same game device. Also, when downloading game data, the game server sets the nullification of the login ID, the copy-prohibiting flag, and the mail transfer-prohibiting flag. It thereby becomes possible to prevent meet registration using another person's game data.

The other embodiments are hereinafter explained. The summary of this embodiment is as follows. The present embodiment is not a competition among teams but is a competition game among horses, 1 example of the characters, which are virtually bred and trained in each of the game terminals. The competitions simulate a plurality of races which are known as Kikka Prize and Ouka Prize. Each race is structured from a preliminary and a final contest.

The data file of each horse is sent from the game terminals to the server. The database server stores the data of the horses sent from each of the game terminals. The EB server performs the calculation processing of the preliminary and final contests for each horse which is entered for each race. The calculation processings are performed at one time. It determines the plurality of horses which win high prizes in the preliminary race, gather the horses determined, perform a final race, and determines a winning horse and horses which win high prizes. The calculation processings for the preliminary race and the final race are performed at one time after the entry.

The data provision means performed by the EB server provides each of the game terminal devices, on respective request, with the data obtained from the result of the preliminary race and the data obtained from the result of the final race. The data obtained from the result of the preliminary race and the data obtained from the result of the final race are not provided to the game terminals at one time but after several days, weeks, months or years later.

In short, the EB server performs the calculation processings for a plurality of competitions at one time and provides each of the game terminal devices with the data, relating to the interim results of the preliminaries and the results of the finals, gradually, for example, day by day.

The advantage of this embodiment over the related art is as follows. Conventionally, the server performs the calculation processing for every preliminary and final, or every kind of race. However, it complicates the operation of the game terminal devices because the player has to enter an element for the competition, such as a horse, into the server for every kind of race.

In the invention performed by the described embodiment, if the player initially enters a competition in which he/she desire to participate, for example, the Kikka Prize or Ouka Prize, the server performs the calculation processings for the competitions from the preliminaries to the finals. Here, if it is set that the player obtains data for the finals at one time, he/she knows the result of the race too early. Therefore, this invention makes it possible to provide the data, for the results of the competitions, from the server to the game terminal devices at certain time intervals.

Next, the embodiment for a typical data provision from the server to the game terminal is explained with reference to the diagrams. FIG. 24 is an calendar regarding the provision of the results of the competitions from the EB server to the game terminal devices.

The calculations for all of the races (Yayoi Prize, Satsuki Prize, etc.) are performed on Sunday. The data for the preliminary contest for the Yayoi Prize is disclosed on the DB server from Monday to Saturday, and the result of the final is disclosed from a day later, Tuesday to Saturday. The result of the preliminary contest for the Satsuki Prize is disclosed from Tuesday to Saturday, and the result of the final is disclosed from Wednesday to Saturday. The results of the other races are disclosed as shown in FIG. 24. The results of all races are accumulated on the DB server and disclosed to each of the game terminals on and after Sunday. It is possible for the game terminals to receive the data of the results of the races from the DB server as shown in the described embodiment by selecting a particular race on the WWW server, and to reproduce the image of the results of the races on the game terminal.

As explained above, the data communication method for game systems relating to the present invention can prohibit double registration of game data from the same person or same game device to a game meet or the like carried out on a game server, and therefore operates in a good way. Also, inappropriate registration of game data using the data of another person's team can be prevented because re-registration of downloaded game data can be eliminated.

What is claimed is:

1. A data communication method for games using a network comprising:

storing in a first storage means of a game terminal device a first identification code assigned in advance to each game terminal device and a second identification code assigned by a server or a network;

storing in a removable second storage means a game data file that includes at least said first identification code; and forming a transmission data file including said second identification code and communicating the transmission data file over the network based on a condition that said first identification code of the game data file stored in said second storage means matches said first identification code stored in said first storage means.

2. The data communication method for games using a network, according to claim 1, wherein said first identification code includes a unique number of the game terminal device, and said second identification code includes a login ID.

3. The data communication method for games using a network, according to claim 1 or 2, wherein said first and second storage means each include a memory card and said second storage means is portable.

4. A data communication method for game systems wherein transmission files including game data are sent to a server from each of a plurality of game terminal devices and competitions are carried out on the server based on the transmission files, comprising:

generating in said game terminal devices transmission files which include unique identification codes and game data and sending the files to said server; and checking, at said server when the unique identification codes in the transmission files do not include identification codes identical to those identification codes previously appended to an accepted transmission file group, the unique identification codes in the transmission files and appending the transmission files to the accepted transmission file group.

5. A data communication method for game systems wherein transmission files including game data are sent to a server from each of a plurality of game terminal devices and competitions are carried out on the server based on the transmission files, comprising:

generating in each game terminal device transmission files including said game data; and checking whether the transmission files store information prohibiting registrations and when the information prohibiting registrations are not stored, appending the transmission files to an accepted transmission file group.

6. The data communication method, according to claim 4 or 5, comprising:

performing competitions based on each transmission file in said accepted transmission file group and disclosing a plurality of results of the competitions;

requesting acquisition at said game terminal devices of the transmission files in said transmission file group from said server; and writing data prohibiting adding said corresponding transmission files to said accepted transmission file group and sending the transmission files to said game terminal devices.

7. A data communication method for game systems wherein a plurality of game terminal devices sends transmission files including game data to a server, and the server performs competitions based on the transmission files, comprising:

generating at said game terminal devices transmission files including unique identification codes and game data, and sending the transmission files to said server;

checking, at said server when the transmission files do not include identification codes identical to those in the registration file, the identification codes in the transmission files and appending the transmission files to a registration file comprised of identification codes including an accepted transmission file group and registration prohibiting information;

performing at said server a competition based on the transmission files registered in said registration file and disclosing a result of the competition;

requesting acquisition at said game terminal devices of the transmission files from said server; and writing registration prohibiting information to the corresponding transmission files and sending the transmission files to said game terminal devices.

8. The data communication method, according to claim 4 or 7, wherein said identification codes include one of a game device production number, E-mail address, log-in ID or password.

9. A data communication method for game systems wherein a plurality of game terminal devices send transmission files including game data to a server and the server performs a plurality of competitions based on the transmission; files, the method comprising:

performing at the server a plurality of said competitions at the same time and storing final results and intermediate results based on the plurality of competitions; and providing each of said plurality of game terminal devices with said final and intermediate results of the competitions at predetermined time intervals.

10. A data communication system for game systems, comprising:

a plurality of game terminal devices configured to send transmission files; and a server for performing a plurality of competitions based on the transmission files, wherein said server includes
a game performance means for carrying out the plurality of said competitions at the same time,
a storage means for storing final results and intermediate results of the plurality of competitions, and
a data providing means for providing each of the plurality of game terminal devices with said final and intermediate results of the plurality of competitions at a predetermined time interval.

11. The data communication system, according to claim 10, wherein said game performance means carries out a plurality of said competitions at one time and said data provision means provides said game terminal devices with said final and intermediate results of the competitions in a time sequence corresponding to day, week, month, and year intervals.

12. The data communication system, according to claim 10, wherein said game performance means carries out a plurality of preliminary and final competitions, and said data provision means provides said game terminal devices with the final results in a day, week, month, and year time sequence.

13. The data communication system according to claim 10, wherein said storage means of said game performance means stores progress data of said competitions at day, week, month, and year time intervals.

14. A program or a storage medium stored with the program, for making at least one of said server and said game terminal perform the data communication method described in one of claims 1, 2, 4, 5, or 7.

15. The game terminal device or the server configured for performing the data communication method described in one of claims 1, 2, 4, 5, or 7.

* * * * *